United States Patent
Sato et al.

(10) Patent No.: US 11,762,161 B2
(45) Date of Patent: Sep. 19, 2023

(54) OPTICAL FIBER CABLE

(71) Applicant: SUMITOMO ELECTRIC INDUSTRIES, LTD., Osaka (JP)

(72) Inventors: Fumiaki Sato, Osaka (JP); Masakazu Takami, Osaka (JP); Tsuguo Amano, Osaka (JP); Yohei Suzuki, Osaka (JP); Yutaka Hashimoto, Osaka (JP); Yoshiaki Nagao, Osaka (JP); Naomichi Osada, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/620,259

(22) PCT Filed: Jun. 17, 2020

(86) PCT No.: PCT/JP2020/023810
§ 371 (c)(1),
(2) Date: Dec. 17, 2021

(87) PCT Pub. No.: WO2020/256019
PCT Pub. Date: Dec. 24, 2020

(65) Prior Publication Data
US 2022/0365300 A1    Nov. 17, 2022

(30) Foreign Application Priority Data

Jun. 19, 2019 (JP) .................................. 2019-113810
Jul. 22, 2019 (JP) .................................. 2019-134351
(Continued)

(51) Int. Cl.
G02B 6/44    (2006.01)

(52) U.S. Cl.
CPC ......... *G02B 6/4432* (2013.01); *G02B 6/4403* (2013.01)

(58) Field of Classification Search
CPC .................................................... G02B 6/52
See application file for complete search history.

(56) References Cited

U.S. PATENT DOCUMENTS 5,734,773 A * 3/1998 Teshima ............... G02B 1/045
                                                385/145
6,049,647 A * 4/2000 Register ............. G02B 6/4416
                                                385/100
(Continued)

FOREIGN PATENT DOCUMENTS

EP       0 985 946 A1       3/2000
EP       2479156 A1 *       7/2012  ............... B05D 1/42
(Continued)

OTHER PUBLICATIONS

WO2006/051898A1 English translation (Year: 2006).*
JP 3773591 B2 English translation (Year: 2006).*

*Primary Examiner* — Charlie Y Peng
(74) *Attorney, Agent, or Firm* — Faegre Drinker Biddle & Reath LLP

(57) ABSTRACT

An optical fiber cable includes: a plurality of optical fibers or a plurality of optical fiber ribbons; a cable sheath inside which a plurality of the optical fibers or a plurality of the optical fiber ribbons are housed; and four or more tensile strength member units which are provided so as to be embedded inside the cable sheath, and in which two or more tensile strength members are paired with each other, in which the four or more tensile strength member units are respectively provided at locations facing each other with a center of the optical fiber cable interposed therebetween in a cross section in a radial direction of the optical fiber cable, and in which a cable outer diameter of the optical fiber cable is 6 mm or more and 16 mm or less.

15 Claims, 12 Drawing Sheets

(30) Foreign Application Priority Data

Sep. 27, 2019 (JP) .................. 2019-176737
Oct. 3, 2019 (JP) .................. 2019-182643

(56) References Cited

U.S. PATENT DOCUMENTS

| | | | |
|---|---|---|---|
| 6,101,305 A | 8/2000 | Wagman et al. | |
| 6,259,844 B1 | 7/2001 | Logan et al. | |
| 2002/0044751 A1 | 4/2002 | Logan et al. | |
| 2007/0104429 A1 | 5/2007 | Yokokawa et al. | |
| 2011/0110635 A1 | 5/2011 | Toge et al. | |
| 2019/0064462 A1 | 2/2019 | Okada et al. | |
| 2019/0310437 A1 | 10/2019 | Sato et al. | |
| 2021/0181410 A1 | 6/2021 | Hamakubo et al. | |
| 2021/0223491 A1* | 7/2021 | Shimizu | G02B 6/4432 |

FOREIGN PATENT DOCUMENTS

| | | | | |
|---|---|---|---|---|
| JP | H02-069706 A | 3/1990 | | |
| JP | H10-170778 A | 6/1998 | | |
| JP | 2000-019366 A | 1/2000 | | |
| JP | 2000-089068 A | 3/2000 | | |
| JP | 2001-021781 A | 1/2001 | | |
| JP | 2001-264601 A | 9/2001 | | |
| JP | 2002-098870 A | 4/2002 | | |
| JP | 2002-231066 A | 8/2002 | | |
| JP | 2002-357750 A | 12/2002 | | |
| JP | 3773591 B2 * | 5/2006 | | B05D 1/42 |
| JP | 2010-008923 A | 1/2010 | | |
| JP | 2011-023274 A | 2/2011 | | |
| JP | 2014-071441 A | 4/2014 | | |
| JP | 2015-517679 T | 6/2015 | | |
| JP | 2017-142285 A | 8/2017 | | |
| WO | WO-0184206 A2 * | 11/2001 | | G02B 6/4433 |
| WO | WO-2006-051898 A1 | 5/2006 | | |
| WO | WO-2011-014452 A2 | 2/2011 | | |
| WO | WO-2013-165407 A1 | 11/2013 | | |
| WO | WO-2016-067611 A1 | 5/2016 | | |
| WO | WO-2018-101041 A1 | 6/2018 | | |
| WO | WO-2018/144223 A1 | 8/2018 | | |
| WO | WO-2019-116967 A1 | 6/2019 | | |

* cited by examiner

FIG. 11

| | SAMPLE 1 | SAMPLE 2 | SAMPLE 3 | SAMPLE 4 | SAMPLE 5 | SAMPLE 6 |
|---|---|---|---|---|---|---|
| CABLE INNER DIAMETER (mm) | 8 | 8 | 8 | 12 | 12 | 12 |
| LDPE SHEATH THICKNESS (mm) | 2 | 1 | 0 | 2 | 1.1 | 0 |
| LDPE CROSS-SECTIONAL AREA (mm²) | 62.8 | 28.3 | 0 | 88.0 | 45.3 | 0 |
| LDPE TENSILE ELASTIC MODULUS (MPa) | 300 | 300 | 300 | 300 | 300 | 300 |
| HDPE SHEATH THICKNESS (mm) | 0 | 1 | 2 | 0 | 0.9 | 2 |
| HDPE CROSS-SECTIONAL AREA (mm²) | 0 | 34.6 | 62.8 | 0 | 42.7 | 88.0 |
| HDPE AREA RATIO (%) | 0 | 55 | 100 | 0 | 49 | 100 |
| HDPE TENSILE ELASTIC MODULUS (MPa) | 1,050 | 1,050 | 1,050 | 1,050 | 1,050 | 1,050 |
| CABLE OUTER DIAMETER (mm) | 12 | 12 | 12 | 16 | 16 | 16 |
| SURFACE FRICTION COEFFICIENT | 0.5 | 0.15 | 0.15 | 0.5 | 0.15 | 0.15 |
| AMOUNT OF CHANGE IN ATTENUATION AT LOW TEMPERATURE (dB/km) | 0.05 | 0.15 | 0.22 | 0.05 | 0.18 | 0.25 |
| SYNTHETIC TENSILE ELASTIC MODULUS (MPa) | 300 | 713 | 1,050 | 300 | 664 | 1,050 |
| SYNTHETIC TENSILE ELASTIC MODULUS × SHEATH TOTAL CROSS-SECTIONAL AREA (N) | 18,850 | 44,768 | 65,973 | 26,389 | 58,410 | 92,363 |
| EVALUATION | B | A | B | B | A | B |

OPTICAL FIBER CABLE

TECHNICAL FIELD

The present disclosure relates to an optical fiber cable.

This application is based upon and claims the benefit of priority from Japanese Patent Application No. 2019-113810 filed on Jun. 19, 2019, Japanese Patent Application No. 2019-176737 filed on Sep. 27, 2019, Japanese Patent Application No. 2019-134351 filed on Jul. 22, 2019, and Japanese Patent Application No. 2019-182643 filed on Oct. 3, 2019, the entire contents of which are incorporated herein by reference.

BACKGROUND ART

Patent Literature 1 describes an optical fiber cable including an intermittent connection type optical fiber ribbon in a pipe.

Patent Literature 2 describes an optical fiber cable in which a unit formed by winding an identification thread around an outer periphery of an optical fiber bundle, in which a plurality of single-core coated optical fibers forming an intermittent connection type optical fiber ribbon are gathered, is mounted.

Patent Literature 3 describes a slot rod type optical fiber cable.

CITATION LIST

Patent Literature

Patent Literature 1: JP-A-2015-517679
Patent Literature 2: JP-A-2010-8923
Patent Literature 3: JP-A-2014-71441

SUMMARY OF INVENTION

An optical fiber cable according to one aspect of the present disclosure includes: a plurality of optical fibers or a plurality of optical fiber ribbons; a cable sheath inside which a plurality of the optical fibers or a plurality of the optical fiber ribbons are housed; and four or more tensile strength member units which are provided so as to be embedded inside the cable sheath, and in which two or more tensile strength members are paired with each other, in which the four or more tensile strength member units are respectively provided at locations facing each other with a center of the optical fiber cable interposed therebetween in a cross section in a radial direction of the optical fiber cable, and in which a cable outer diameter of the optical fiber cable is 6 mm or more and 16 mm or less.

BRIEF DESCRIPTION OF DRAWINGS

FIG. 11 is a table illustrating a specification and an evaluation result of each sample of the optical fiber cable according to the fifth embodiment.

DESCRIPTION OF EMBODIMENTS

Technical Problem

Figure 1:
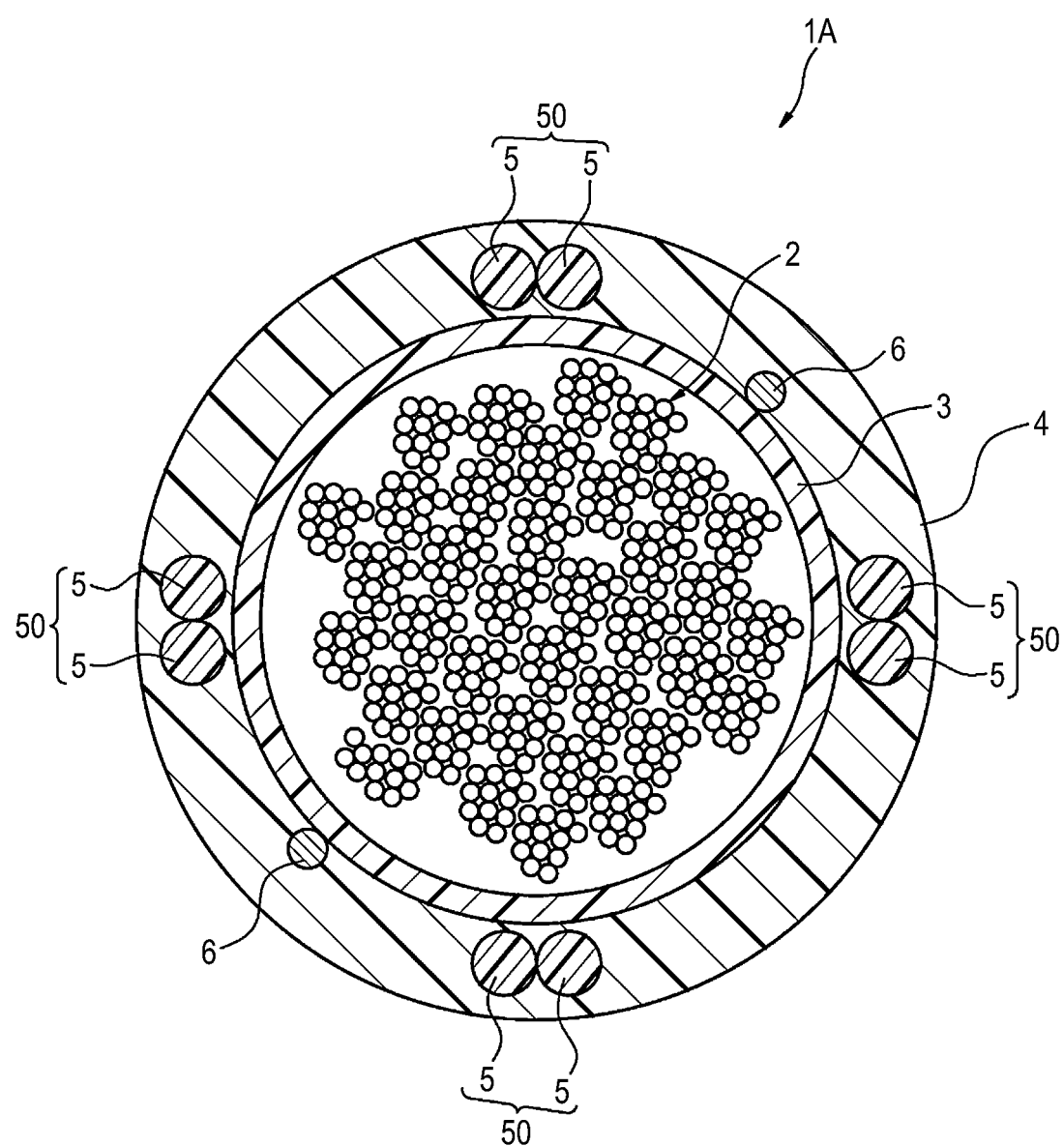
FIG. 1 is a cross-sectional view illustrating a configuration of an optical fiber cable according to a first embodiment.

When an optical fiber cable has a structure having tensile strength members on opposite sides of a sheath, the optical fiber cable tends to be bent in a 90-degree direction with respect to a line connecting the tensile strength members in a cross section in a radial direction of the optical fiber cable, such that bending rigidity in the above-described direction tends to below. On the other hand, the optical fiber cable tends to be difficult to be bent in a direction of the tensile strength member, and tends to have a large bending rigidity in the above-described direction. That is, the optical fiber cable having the above-described structure has bending anisotropy.

In the case of forming an optical fiber cable for pneumatic feeding based on the above-described structure, since there is the bending anisotropy, the optical fiber cable therefor is easy to be bent in a direction in which the bending rigidity is low when the optical fiber cable is pneumatically fed into a duct and pushed thereinto, which may cause buckling of the optical fiber cable in the middle of the duct. Therefore, it is difficult for the optical fiber cable for pneumatic feeding based on the above-described structure to obtain a good pneumatic feeding characteristic.

In the optical fiber cable for pneumatic feeding, a cable sheath thickness is thinned in order to reduce a diameter and weight, and a hard cable sheath is often used. In this case, only a thin tensile strength member can be placed in the cable sheath, and it is difficult to prevent rigidity deterioration and linear expansion of the cable sheath. On the other hand, as in optical fiber cables such as a loose tube type, a slot rod type, or the like, when a structure is formed in such a manner that a tensile strength member having a large diameter or a bundle of a plurality of tensile strength members is disposed in a center, an internal space is reduced by a volume of the tensile strength member, such that it is difficult to increase a core density of the optical fiber cable.

An object of the present disclosure is to provide an optical fiber cable having a good pneumatic feeding characteristic.

Advantageous Effects of the Present Disclosure

According to the present disclosure, it is possible to provide an optical fiber cable having a good pneumatic feeding characteristic.

Description of Embodiments of the Present Disclosure

First, embodiments of the present disclosure will be listed and described.

An optical fiber cable according to one aspect of the present disclosure includes:

(1) a plurality of optical fibers or a plurality of optical fiber ribbons; a cable sheath inside which a plurality of the optical fibers or a plurality of the optical fiber ribbons are housed; and four or more tensile strength member units which are provided so as to be embedded inside the cable sheath, and in which two or more tensile strength members are paired with each other, in which the four or more tensile strength member units are respectively provided at locations facing each other with a center of the optical fiber cable interposed therebetween in a cross section in a radial direction of the optical fiber cable, and in which a cable outer diameter of the optical fiber cable is 6 mm or more and 16 mm or less.

According to the optical fiber cable having the above-described configuration, since there are well-balanced tensile strength member units in which two or more tensile strength members are paired with each other, bending anisotropy (bias in an easily bendable direction) of the optical fiber cable can be prevented. Therefore, for example, when the optical fiber cable is pneumatically fed into a duct or pushed thereinto, occurrence of buckling in the middle of the duct can be prevented. For this reason, the optical fiber cable having the above-described configuration can obtain a good pneumatic feeding characteristic. Since the outer diameter of the cable is 16 mm or less, the cable can be housed in a micro-duct having a general inner diameter of 20 mm or less. When the outer diameter of the cable is less than 6 mm, the buckling is likely to occur during the pneumatic feeding in a case where the micro-duct is bent to a small diameter and laid. However, since the optical fiber cable having the above-described configuration has the cable outer diameter of 6 mm or more, it is possible to prevent the occurrence of buckling during the pneumatic feeding.

(2) At least four tensile strength member units of the four or more tensile strength member units of the optical fiber cable may be disposed at locations where straight lines respectively connecting a pair of the tensile strength member units are orthogonal to each other in the cross section in the radial direction of the optical fiber cable.

According to the optical fiber cable having the above-described configuration, since the tensile strength member unit is provided in a more well-balanced manner, the bending anisotropy (the bias in the easily bendable direction) of the optical fiber cable can be further prevented.

(3) Bending rigidity in the radial direction of the optical fiber cable may be 0.35 N·m$^2$ or more and 1.3 N·m$^2$ or less in all directions.

According to the optical fiber cable having the above-described configuration, when the bending rigidity of the optical fiber cable is within the above-described range, an appropriate bending rigidity suitable for the pneumatic feeding can be obtained. Since the bending rigidity in the radial direction is 0.35 N·m$^2$ or more in all directions, the buckling during the pneumatic feeding of the optical fiber cable can be prevented, and since the bending rigidity in the radial direction is 1.3 N·m$^2$ or less in all directions, good storability is obtained when an extra length of the optical fiber cable is stored.

(4) The tensile strength member may be aramid FRP.

(5) The tensile strength member may be a liquid crystal polymer.

Since the aramid FRP and the liquid crystal polymer have a relatively high elastic modulus, the cable rigidity can be appropriately increased. Since the aramid FRP and the liquid crystal polymer have a relatively low linear expansion coefficient, it is possible to reduce shrinkage of the optical fiber cable in a low temperature environment. Since the aramid FRP and the liquid crystal polymer are non-inductive, it is not required to provide a ground as a countermeasure against lightning.

(6) The cable sheath may contain a silicone-based release agent.

According to the optical fiber cable having the above-described configuration, since the cable sheath contains the silicon-based release agent, a friction coefficient of the cable sheath can be reduced. As a result, when the optical fiber cable is pneumatically fed into the duct, the friction between the cable sheath and the duct is reduced, such that a pneumatic feeding distance can be extended.

(7) Mass fraction of the silicone-based release agent contained in the cable sheath may be 1.5% or more.

According to the optical fiber cable having the above-described configuration, since the mass fraction of the silicon-based release agent contained in the cable sheath is 1.5% or more, the friction coefficient of the cable sheath can be reduced more reliably.

(8) The cable sheath may include a protrusion protruding in the radial direction of the optical fiber cable on an outer peripheral portion.

According to the optical fiber cable having the above-described configuration, since there is the protrusion protruding in the radial direction of the optical fiber cable on the outer peripheral portion of the cable sheath, a contact area between the cable sheath and the duct can be reduced when the optical fiber cable is pneumatically fed into the duct. As a result, the friction between the cable sheath and the duct is reduced, such that the pneumatic feeding distance can be extended.

(9) In the protrusion, an angle formed by tangent lines of both surfaces at intersections between a surface of the protrusion and a surface of the outer peripheral portion which is not the protrusion may be 90 degrees or less in the cross section in the radial direction of the optical fiber cable.

According to the optical fiber cable having the above-described configuration, since the angle formed by the tangent lines between both the surfaces at the intersection is 90 degrees or less, a blade such as a nipper or the like can be easily fixed to a portion of the intersection. As a result, when the protrusion is cut, it is possible to prevent a state in which the nipper or the like slip and cutting the protrusion becomes difficult. Therefore, the protrusion can be easily removed, and airtightness can be maintained when the optical fiber cable is housed in a closure.

(10) The protrusion may be spirally formed along a longitudinal direction of the optical fiber cable.

According to the optical fiber cable having the above-described configuration, since the protrusion is spirally formed along the longitudinal direction of the optical fiber cable, an inner wall of the duct and the optical fiber cable are in point contact, such that contact resistance can be further reduced.

(11) The cable sheath may include a concave portion on a surface thereof, and an identification display may be applied only to the concave portion.

According to the optical fiber cable having the above-described configuration, since there is little risk of friction between the concave portion and the inner surface of the duct during the pneumatic feeding, there is little risk that the identification display applied only to the concave portion is scraped off. Therefore, it is easy to visually recognize the identification display applied to the cable sheath. Since the surface of the cable sheath becomes concave and convex by providing the concave portion on the surface of the cable sheath, a contact area between the surface of the cable sheath and the inner surface of the duct is reduced, such that the friction between the surface of the cable sheath and the inner surface of the duct can be reduced during the pneumatic feeding. Accordingly, the pneumatic feeding distance can be extended when the optical fiber cable is pneumatically fed into the duct.

(12) The cable sheath may include: an inner layer provided on an outside of a gathering core in which a plurality of the optical fibers or a plurality of the optical fiber ribbons are housed together; and an outer layer provided on an outside of the inner layer, in which a density of a material used for the outer layer thereof may be 0.942 (g/cm$^2$) or more, and in which a density of a material used for the inner layer thereof may be less than 0.942 (g/cm$^3$).

According to the optical fiber cable having the above-described configuration, the cable sheath is formed of the two layers including the inner layer and the outer layer, and the density of the material to be used for the outer layer is higher than that of the inner layer, such that the friction coefficient is lower than that of a case where only the inner layer material is used, and the optical fiber cable easily passes through the duct. Even though the pneumatic feeding supplied into the duct is increased or pushed into the duct, the optical fiber cable can sufficiently withstand the pneumatic feeding because the outer layer thereof is hard enough.

(13) The cable sheath may contain flame-retardant PVC or flame-retardant polyethylene having an oxygen index of 50 or more.

Since the optical fiber cable for pneumatic feeding has a structure in which a thin cable sheath is used, it is difficult to improve flame retardancy. However, according to the optical fiber cable having the above-described configuration, the flame retardancy can be improved by using the flame-retardant PVC or the flame-retardant polyethylene having the oxygen index of 50 or more for the cable sheath.

(14) The optical fiber or an optical fiber forming the optical fiber ribbon may include: a glass fiber; and a coating that covers an outer periphery of the glass fiber, in which the coating may include two coating layers, in which an outer coating layer of the two coating layers may be a cured product of a resin composition containing: a base resin containing a urethane acrylate oligomer or a urethane meth-acrylate oligomer, a monomer having a phenoxy group, a photopolymerization initiator, and a silane coupling agent; and a hydrophobic inorganic oxide particle, and in which a content of the inorganic oxide particle the resin composition may be 1% by mass or more and 45% by mass or less based on a total amount of the resin composition.

According to the optical fiber cable having the above-described configuration, by using the resin composition as the outer coating layer forming the coating in the optical fiber, lateral pressure resistance of the optical fiber becomes stronger. Accordingly, an increase in transmission loss of the optical fiber cable can be prevented.

(15) In the optical fiber or an optical fiber forming the optical fiber ribbon, a bending loss at a wavelength of 1,550 nm may be 0.5 dB or less for a bending diameter of φ15 mm×1 turn, and 0.1 dB or less for a bending diameter of φ20 mm×1 turn.

According to the optical fiber cable having the above-described configuration, a lateral pressure characteristic can be improved and an attenuation at low temperature characteristic can be improved.

(16) The optical fiber or an optical fiber forming the optical fiber ribbon may include a multi-core fiber in which the number of cores per optical fiber is four or more.

According to the optical fiber cable having the above-described configuration, since separate information can be transmitted to each core, a transmission capacity per optical fiber can be increased.

Details of Embodiments of the Present Disclosure

A specific example of an optical fiber cable according to embodiments of the present disclosure will be described below with reference to the drawings.

The present disclosure is not limited to these embodiments, indicated by the scope of claims, and intended to include all the modifications within the meaning equivalent to the scope of claims and within the scope thereof.

First Embodiment

An optical fiber cable 1A according to a first embodiment will be described with reference to FIGS. 1 and 2.

FIG. 1 is a cross-sectional view perpendicular to a length direction of the optical fiber cable 1A. As illustrated in FIG. 1, the optical fiber cable 1A includes a plurality of optical fiber ribbons 2, a water absorbing tape 3 that covers a periphery of the optical fiber ribbon 2, a cable sheath 4 inside which the optical fiber ribbon 2 covered with the water absorbing tape 3 is housed, and a tensile strength member 5 and a tear string 6 that are provided inside the cable sheath 4.

The water absorbing tape 3 is, for example, longitudinally or spirally wrapped around a periphery of the whole of a plurality of optical fiber ribbons 2. The water absorbing tape 3 is, for example, formed by attaching a water absorbing powder to a base cloth formed of polyester or the like and performing a water absorbing process thereon.

The cable sheath 4 is provided so as to cover a periphery of the water absorbing tape 3. The cable sheath 4 is formed of, for example, a resin such as polyvinyl chloride (PVC), polyethylene (PE), or the like. The resin of the cable sheath 4 desirably has a Young's modulus of 500 Pa or more. It is desirable that the cable sheath 4 contains a silicone-based release agent. The silicon-based release agent is contained therein, for example, in a proportion of 1 wt % or more, and desirably 1.5 wt % or more and 2.5 wt % or less.

In addition, it is desirable that the cable sheath 4 is formed of a resin having high flame retardancy. The cable sheath 4 is formed of, for example, flame-retardant PVC having an oxygen index of 50 or more, flame-retardant polyethylene, or the like. Accordingly, the optical fiber cable 1A conforms to the UL1666 riser grade in the North American National Electrical Code (NEC) standard and the Cca class in the European Construction Products Regulation (CPR) standard. The cable sheath 4 is, for example, a thermoplastic resin, and is formed by performing extrusion molding of the resin on a plurality of optical fiber ribbons 2 around which the water absorbing tape 3 is wrapped.

The tensile strength member 5 is provided so as to be embedded inside the cable sheath 4. The tensile strength member 5 is formed of, for example, fiber-reinforced plastic (FRP) such as aramid FRP, glass FRP, carbon FRP, or the like. The tensile strength member 5 may be formed of a liquid crystal polymer. The tensile strength member 5 is desirably non-inductive.

The tensile strength member 5 has a circular cross section in a radial direction. Eight or more tensile strength members 5 (eight in this example) are provided. The eight tensile strength members 5 in this example are provided in pairs of two each. The two paired tensile strength members 5 are provided, for example, in a state of being close to each other or at least partially in contact with each other. The tensile strength member 5 is provided in the cable sheath 4 along a longitudinal direction of the optical fiber cable 1A. In the following description, the two paired tensile strength members 5 are collectively referred to as a tensile strength member unit 50.

In this example, four tensile strength member units 50 are provided. In the four tensile strength member units 50, two pairs of two paired tensile strength member units 50 are provided at locations facing each other with a center of the optical fiber cable 1A interposed therebetween in a cross section in a radial direction of the optical fiber cable 1A. The locations of the four tensile strength member units 50 in the cross section in the radial direction of the optical fiber cable 1A become, for example, locations in which two straight lines respectively connecting the two paired tensile strength member units 50 are orthogonal to each other.

For example, when the number of tensile strength members 5 is more than eight and the number of tensile strength member units 50 is more than four, each tensile strength member unit 50 is provided in the cable sheath 4 so that a space between the tensile strength member units 50 adjacent to each other becomes, for example, an equal space therebetween.

The tear string 6 is provided fir tearing the cable sheath 4, and is embedded in the cable sheath 4 along the longitudinal direction of the optical fiber cable 1A. In the case of this example, two tear strings 6 are provided. The two tear strings 6 are provided so as to face each other at an approximately intermediate location of the tensile strength member units 50 adjacent to each other. By pulling out the tear string 6, the cable sheath 4 can be torn in the longitudinal direction, and the optical fiber ribbon 2 can be taken out. The tear string 6 is formed of, for example, a pull-resistant plastic material (for example, polyester).

Figure 2:
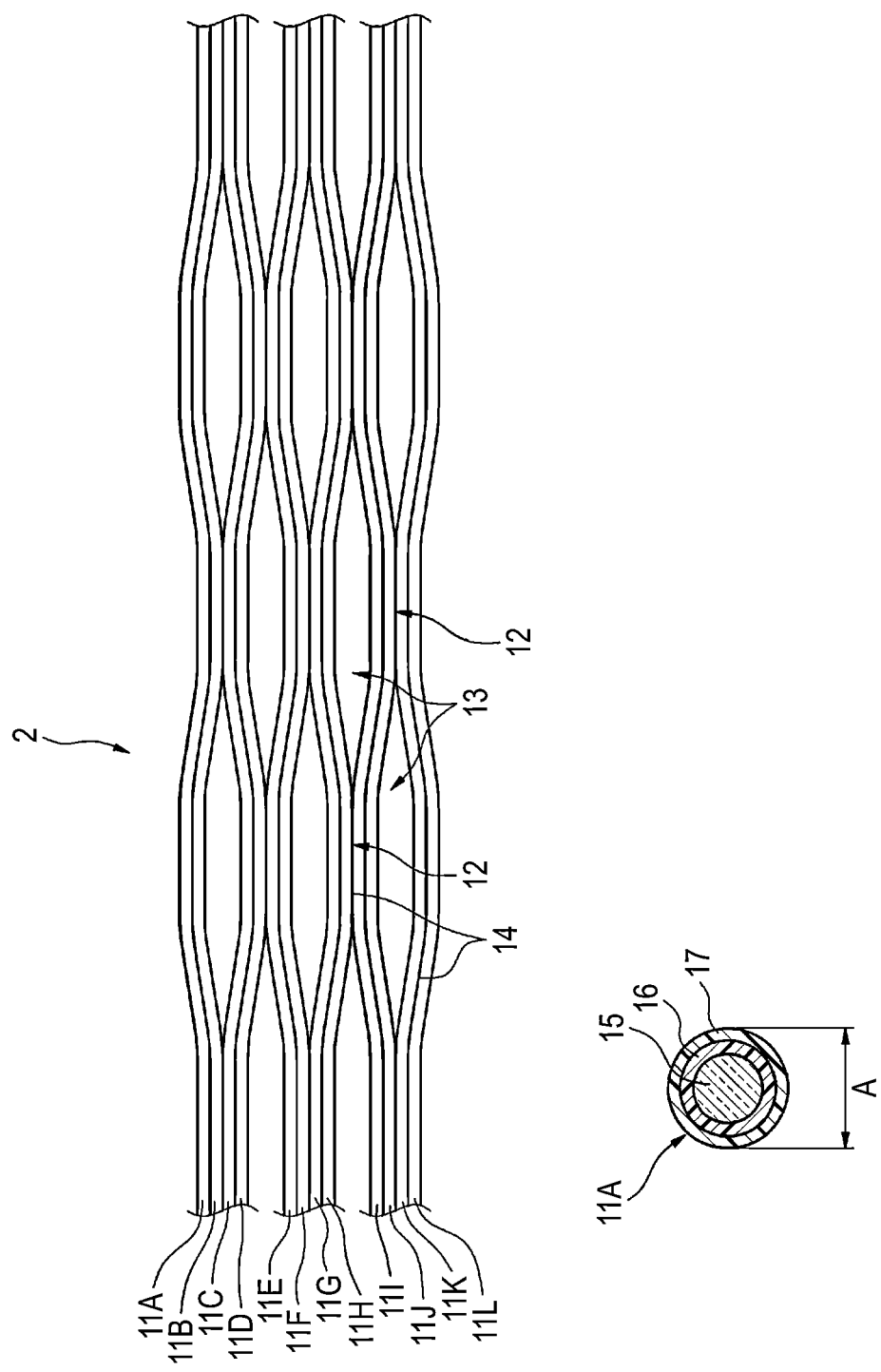
FIG. 2 is a plan view illustrating an example of an optical fiber ribbon housed in the optical fiber cable.

FIG. 2 illustrates an example of the optical fiber ribbon 2 housed in the optical fiber cable 1A. As illustrated in FIG. 2, the optical fiber ribbon 2 is an intermittent connection type optical fiber ribbon in which a connecting portion 12 in which the optical fibers adjacent to each other are connected to each other and a non-connecting portion 13 in which the optical fibers adjacent to each other are not connected to each other are intermittently provided in the longitudinal direction in a state where a plurality of optical fibers 11A to 11L are disposed in parallel to each other.

In the optical fiber ribbon 2 of this example, twelve optical fibers 11A to 11L are disposed in parallel to each other. FIG. 2 illustrates a plan view of the intermittent connection type optical fiber ribbon 2 in a state where the optical fibers 11A to 11L are opened in a disposition direction, and a cross-sectional view of the optical fiber 11A. As illustrated in FIG. 2, a portion where the connecting portion 12 and the non-connecting portion 13 are provided intermittently may be between some optical fibers (intermittently provided every two cores), or may be between all the optical fibers (intermittently provided for each core). In the example illustrated in FIG. 2, the non-connecting portion 13 is not provided between the optical fibers 11A and 11B, 11C and 11D, 11E and 11F, 11G and 11H, 11I and 11J, and 11K and 11L.

The connecting portion 12 in the optical fiber ribbon 2 is formed by applying, for example, a connecting resin 14 formed of an ultraviolet curable resin, a thermosetting resin, or the like between the optical fibers. By applying the connecting resin 14 between the predetermined optical fibers, the connecting portion 12 and the non-connecting portion 13 are intermittently provided, and the respective optical fibers 11A to 11L are integrated in a parallel state. The connecting resin 14 may be applied to only one side surface of a parallel surface to be formed by the optical fibers 11A to 11L, disposed in parallel to each other, or may be applied to both side surfaces thereof. The optical fiber ribbon 2 may be manufactured by, for example, applying a tape resin to one side surface or both side surfaces of the optical fibers 11A to 11L, disposed in parallel to each other, connecting all the optical fibers 11A to 11L, and cutting off a part with a rotary blade or the like to form the non-connecting portion 13.

The optical fibers 11A to 11L include, for example, a glass fiber 15 formed of a core and a clad, and two coating layers 16 and 17 covering an outer periphery of the glass fiber 15. The inner coating layer 16 of the two coating layers is formed of a primary resin. The outer coating layer 17 of the two coating layers is formed of a secondary resin. The optical fibers 11A to 11L are so-called small diameter core wires, and an outer diameter A thereof is, for example, 165 μm or more and 220 μm or less. The optical fibers 11A to 11L may be a multi-core fiber in which the number of cores per optical fiber is four or more. Since the multi-core fiber can send different information for each core, a transmission capacity per optical fiber can be increased.

As the primary resin forming the inner coating layer 16 in contact with the glass fiber 15, a soft resin having a relatively low Young's modulus is used as a buffer layer. As the secondary resin forming the outer coating layer 17, a hard resin having a relatively high Young's modulus is used as a protective layer. The Young's modulus of the secondary resin at, for example, 23° C. is 900 MPa or more, desirably 1,000 MPa or more, and more desirably 1,500 MPa or more.

It is desirable that the secondary resin forming the outer coating layer 17 is a resin composition containing: a base resin containing a urethane acrylate oligomer or a urethane methacrylate oligomer, a monomer having a phenoxy group, a photopolymerization initiator, and a silane coupling agent; and a hydrophobic inorganic oxide particle. A content of the inorganic oxide particle in the resin composition is 1% by mass or more and 45% by mass or less based on a total amount of the resin composition.

Hereinafter, acrylate or methacrylate corresponding thereto will be referred to as (meth) acrylate.

As the urethane (meth) acrylate oligomer, an oligomer obtained by reacting a polyol compound, a polyisocyanate compound, and a hydroxyl group-containing (meth) acrylate compound can be used. This oligomer can be obtained, for example, by reacting polypropylene glycol, isophorone diisocyanate, hydroxyethyl acrylate, and methanol having a molecular weight of 4,000.

As the monomer having the phenoxy group, a (meth) acrylate compound having the phenoxy group can be used. For example, the monomer having the phenoxy group includes nonylphenol EO modified acrylate (a brand name "ARONIX M-113" of Toagosei Co., Ltd.), or the like.

As the photopolymerization initiator, one of known radical photopolymerization initiators can be appropriately selected and used, and for example, the photopolymerization initiator includes 2,4,6-trimethylbenzoyldiphenylphosphine oxide or the like.

The silane coupling agent is not particularly limited as long as the silane coupling agent does not interfere with the curing of the resin composition. For example, the silane coupling agent includes 3-mercaptopropyltrimethoxysilane or the like.

The hydrophobic inorganic oxide particle has a hydrophobic group introduced into a surface of the inorganic oxide particle. The inorganic oxide particle is, for example, a silica particle. The hydrophobic group may be a reactive group such as a (meth) acryloyl group, a vinyl group, or the like, or a non-reactive group such as a hydrocarbon group (for example, an alkyl group), an aryl group (for example, a phenyl group), or the like.

A lateral pressure characteristic of the optical fibers 11A to is improved by blending the inorganic oxide particle with the secondary resin forming the coating layer 17. The primary resin forming the coating layer 16 and the secondary resin are formed of, for example, an ultraviolet curable resin, a thermosetting resin, or the like.

When the optical fiber ribbon 2 is housed in the optical fiber cable 1A, the optical fiber ribbon 2 is in a state of being rolled to be gathered. Alternatively, a plurality of optical fiber ribbon 2 may be stranded together to form a unit, and the plurality of units may be in a state of being gathered. The plurality of optical fiber ribbons 2 in a state of being gathered may be bundled with a bundle material or the like, or may be bundled with the bundle material or the like for each unit.

In the optical fiber cable 1A having the above-described configuration, it is desirable that a ratio of a total cross-sectional area of the eight tensile strength members 5 (four tensile strength member units 50) to a cross-sectional area of the cable sheath 4 is 5.4% or more. An outer diameter of the optical fiber cable 1A is 6 mm or more and 16 mm or less, and for example, when the optical fiber cable 1A has the outer diameter of 10 mm, a thickness of the cable sheath 4 is 1.0 mm, and eight tensile strength members 5 having an outer diameter of 0.5 mm are provided in the cable sheath 4, the ratio of the total cross-sectional area becomes 5.6%. It is desirable that bending rigidity in the radial direction of the optical fiber cable 1A is 0.35 N·m$^2$ or more and 1.3 N·m$^2$ or less in the whole circumference direction.

In addition, it is desirable that a core density obtained by dividing the number of cores of all the optical fibers forming the plurality of optical fiber ribbons 2 by a cable cross-sectional area of the optical fiber cable 1A is 5.0 cores/mm$^2$ or more. For example, when the optical fiber cable 1A has the outer diameter of 10 mm, the thickness of the cable sheath 4 is 1.0 mm, and the outer diameter A of the optical fiber is 200 μm, and when the number of optical fiber ribbons 2 including 12 cores housed in the cable sheath 4 of the optical fiber cable 1A is 36, at that time, the number of cores of all optical fibers is 432 cores, and the core density is 5.5 cores/mm$^2$. In consideration of the pneumatic feeding, it is desirable that a unit weight of the optical fiber cable 1A is 100 kg/km or less.

While the optical fiber ribbon 2 including 12 cores is used in this example, for example, an optical fiber ribbon including 16 cores or 24 cores may be used. In this example, while the optical fiber ribbon is housed in the optical fiber cable 1A, the optical fiber may be housed therein as it is without forming a tape shape. It is desirable that the optical fibers 11A to 11L have a bending loss equivalent to that of ITU-T G.657A2 in which the bending loss at a wavelength of 1,550 nm is 0.5 dB or less for a bending diameter of φ15 mm×1 turn, and 0.1 dB or less for a bending diameter of φ20 mm×1 turn. By using the above-described optical fiber, the lateral pressure characteristic can be improved, and an attenuation at low temperature characteristic can also be improved.

According to the optical fiber cable 1A according to the first embodiment as described above, since the tensile strength member unit 50, in which two of the tensile strength members 5 are configured to be paired with each other, is disposed in a well-balanced manner inside the cable sheath 4, bending anisotropy (bias in an easily bendable direction) of the optical fiber cable 1A can be prevented.

Accordingly, it is possible to prevent the optical fiber cable 1A from buckling in the middle of a duct when, for example, the optical fiber cable 1A is pneumatically fed into the duct and pushed thereinto. Therefore, the optical fiber cable 1A can have a good pneumatic feeding characteristic.

Since the outer diameter of the optical fiber cable 1A is 16 mm or less, the optical fiber cable 1A can be pneumatically fed into a micro-duct having a small inner diameter of 20 mm or less, and can also be housed in the micro-duct.

When the outer diameter of the optical fiber cable is less than 6 mm, and when the duct is bent to a small diameter and laid, the buckling is likely to occur in the optical fiber cable when the optical fiber cable is pneumatically fed into the duct. On the other hand, since the optical fiber cable 1A has a cable outer diameter of 6 mm or more, it is possible to prevent the occurrence of buckling when the optical fiber cable is pneumatically fed thereinto.

In addition, the optical fiber cable 1A sets the bending rigidity in the radial direction thereof to a range of 0.35 N·m$^2$ or more and 1.3 N·m$^2$ or less in the whole circumferential direction, thereby making it possible to be provided with an appropriate bending rigidity suitable for the pneumatic feeding. For example, since the bending rigidity in the radial direction is 0.35 N·m$^2$ or more in the whole circumferential direction, it is possible to prevent the occurrence of buckling when the optical fiber cable 1A is pneumatically fed. The bending rigidity in the radial direction is 1.3 N·m$^2$ or less in the whole circumferential direction, such that when the extra length of the optical fiber cable 1A is stored in, for example, a hand hole or the like, the optical fiber cable 1A can be bundled to an appropriate size and has good storability.

In addition, in the optical fiber cable 1A, it is desirable that the tensile strength member 5 is formed of, for example, aramid FRP, a liquid crystal polymer, or the like. According to this configuration, since the aramid FRP, the liquid crystal polymer, or the like have a relatively high elastic modulus, the rigidity of the optical fiber cable 1A can be appropriately increased. Since the aramid FRP, the liquid crystal polymer, or the like have a relatively low linear expansion coefficient, it is possible to prevent shrinkage of the optical fiber cable 1A caused by shrinkage of the cable sheath 4 in a low temperature environment. Since the aramid FRP, the liquid crystal polymer, or the like are non-inductive, it is not required to provide a ground as a countermeasure against lightning.

In addition, in the optical fiber cable 1A, it is desirable that the resin of the cable sheath 4 contains the silicon-based release agent. According to this configuration, a friction coefficient of the cable sheath 4 can be reduced. Mass fraction of the silicon-based release agent contained in the cable sheath 4 is set to 1.5% or more, such that the friction coefficient of the cable sheath 4 can be more reliably reduced. Accordingly, when the optical fiber cable 1A is pneumatically fed into the duct, a friction between the cable sheath 4 and an inner wall of the duct can be reduced, such that a pneumatic feeding distance can be extended.

Meanwhile, it is difficult to improve flame retardancy of the optical fiber cable for pneumatic feeding due to a structure thereof in which the cable sheath is thin. On the other hand, the flame retardancy of the optical fiber cable 1A can be improved by forming the cable sheath 4 with flame-retardant PVC or flame-retardant polyethylene having an oxygen index of 50 or more.

In addition, according to the optical fiber cable 1A, a cured product of the above-described resin composition is used as the outer coating layer 17 forming the coating of the optical fibers 11A to 11L, thereby making it possible to improve the lateral pressure resistance of the optical fibers 11A to 11L. Therefore, when the optical fiber ribbon 2 is formed by using such optical fibers 11A to 11L, it is possible to prevent an increase in transmission loss when the optical fiber ribbon 2 is housed in the optical fiber cable 1A.

Second Embodiment

An optical fiber cable 1B according to a second embodiment will be described with reference to FIGS. 3 and 4. The same configurations as those of the optical fiber cable 1A according to the first embodiment will be denoted by the same reference signs, and the description thereof will be omitted.

Figure 3:
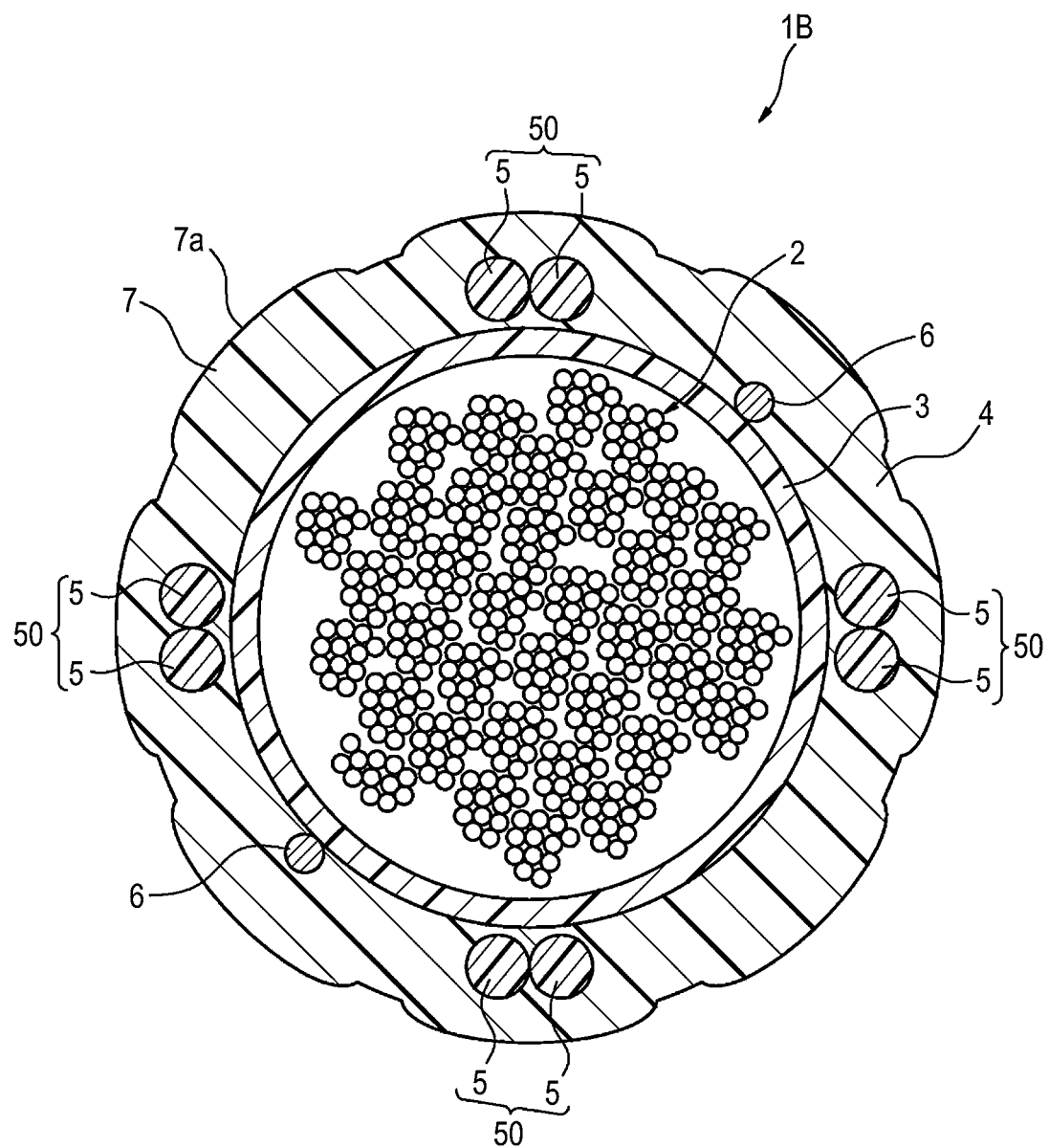
FIG. 3 is a cross-sectional view illustrating a configuration of an optical fiber cable according to a second embodiment.
Figure 4:
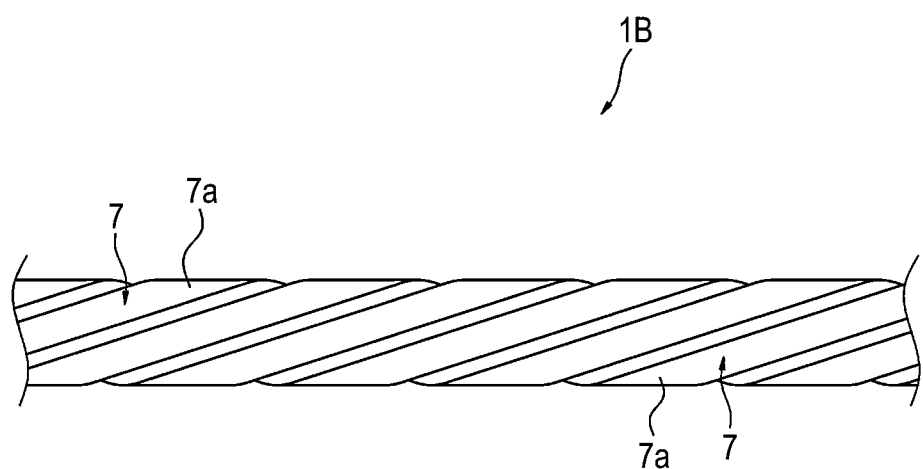
FIG. 4 is a side view of the optical fiber cable illustrated in FIG. 3.

FIG. 3 is a cross-sectional view perpendicular to a longitudinal direction of the optical fiber cable 1B. FIG. 4 is a side view of the optical fiber cable 1B illustrated in FIG. 3.

As illustrated in FIG. 3, the optical fiber cable 1B includes a plurality of intermittent connection type optical fiber ribbons 2, the water absorbing tape 3 that covers the periphery of the optical fiber ribbon 2, the cable sheath 4 inside which the optical fiber ribbon 2 covered with the water absorbing tape 3 is housed, and the tensile strength member 5 and the tear string 6 that are provided inside the cable sheath 4. The optical fiber cable 1B includes a protrusion 7 on an outer peripheral portion of the cable sheath 4.

A plurality of protrusions 7 (eight in this example) are provided. As illustrated in FIG. 4, the eight protrusions 7 are spirally provided along the longitudinal direction of the optical fiber cable 1B. Each protrusion 7 may be provided continuously along the longitudinal direction, or may be provided intermittently therealong. The eight protrusions 7 are provided at an approximately equal space in a circumferential direction of the outer peripheral portion of the cable sheath 4 in a cross section in a radial direction of the optical fiber cable 1B. The protrusion 7 is formed on the outer peripheral portion of the cable sheath 4 in a state of protruding in the radial direction of the optical fiber cable 1B. A surface 7a in a protruding direction of the protrusion 7 is formed with a curved surface, and is formed so that a radius of curvature of the curved surface is set to 2.5 mm or more. The protrusion 7 is formed to be integrated with the cable sheath 4 by extrusion molding. In this example, the eight protrusions 7 are spirally provided, and for example, may be provided linearly along the longitudinal direction of the optical fiber cable 1B.

According to the optical fiber cable 1B according to the second embodiment, a plurality of protrusions 7 protruding in the radial direction of the optical fiber cable 1B are provided on the outer peripheral portion of the cable sheath 4. Therefore, when the optical fiber cable 1B is pneumatically fed into the duct, the protrusion 7 contacts the inner wall of the duct, such that a contact area between the cable sheath 4 and the duct can be reduced. Accordingly, the friction between the cable sheath 4 and the duct is reduced, such that the pneumatic feeding distance can be extended.

In addition, according to the optical fiber cable 1B, the protrusion 7 of the cable sheath 4 is spirally formed along the longitudinal direction of the optical fiber cable 1B. Accordingly, when the optical fiber cable 1B is pneumatically fed into the duct, the inner wall of the duct and the cable sheath 4 of the optical fiber cable 1B are in a state of being close to point contact. Therefore, the friction between the two can be further reduced, such that the pneumatic feeding distance can be extended.

Example 1

In the optical fiber cable 1A of the first embodiment and the optical fiber cable 1B of the second embodiment, evaluation of the pneumatic feeding distance is performed with respect to a sample of an optical fiber cable of each example, in which the type and number of tensile strength members 5 and the structure of the cable sheath 4 are different, and a sample of an optical fiber cable of each comparative example of a related-art structure. An evaluation result thereof is shown in Table 1.

TABLE 1

| Sample No. | Tensile strength member configuration | Bending rigidity (N · m2) | Sheath structure | Dynamic friction coefficient | Pneumatic feeding distance (m) (Evaluation) |
|---|---|---|---|---|---|
| 1 | Two glass FRPs having outer diameter of 0.5 mm | Maximum 1.0, Minimum 0.1 | HDPE No protrusion | 0.3 | 600 m (C) |
| 2 | Four glass FRPs having outer diameter of 0.5 mm | Maximum 1.0, Minimum 0.8 | HDPE No protrusion | 0.3 | 1,100 m (B) |
| 3 | Four aramid FRPs having outer diameter of 0.5 mm | Maximum 0.8, Minimum 0.3 | HDPE No protrusion | 0.3 | 1,000 m (B) |
| 4 | Eight glass FRPs having outer diameter of 0.5 mm | Maximum 2.5, Minimum 1.2 | HDPE No protrusion | 0.3 | 1,500 m (A) |
| 5 | Eight aramid FRPs having outer diameter of 0.5 mm | Maximum 1.2, Minimum 0.4 | HDPE No protrusion | 0.3 | 1,300 m (A) |

TABLE 1-continued

| Sample No. | Tensile strength member configuration | Bending rigidity (N · m2) | Sheath structure | Dynamic friction coefficient | Pneumatic feeding distance (m) (Evaluation) |
|---|---|---|---|---|---|
| 6 | Eight aramid FRPs having outer diameter of 0.5 mm | Maximum 1.2, Minimum 0.4 | HDPE silicon of 1 wt % is added No protrusion | 0.15 | 1,500 m (A) |
| 7 | Eight aramid FRPs having outer diameter of 0.5 mm | Maximum 1.2, Minimum 0.4 | HDPE silicon of 1.5 wt % is added No protrusion | 0.12 | 1,800 m (S) |
| 8 | Eight aramid FRPs having outer diameter of 0.5 mm | Maximum 1.0, Minimum 0.35 | HDPE silicon of 2.5 wt % is added No protrusion | 0.11 | 1,850 m (S) |
| 9 | Eight aramid FRPs having outer diameter of 0.5 mm | Maximum 1.2 Minimum 0.4 | HDPE silicon of 1.5 wt % is added Protrusion is linearly provided | 0.11 | 1,900 m (S) |
| 10 | Eight aramid FRPs having outer diameter of 0.5 mm | Maximum 1.2, Minimum 0.4 | HDPE silicon of 1.5 wt % is added Protrusion is spirally provided | 0.1 | 2,000 m (S) |
| 11 | Eight liquid crystal polymers having outer diameter of 0.5 mm | Maximum 1.3, Minimum 0.5 | HDPE silicon of 2.5 wt % is added No protrusion | 0.11 | 1,930 m (S) | in Table 1, samples Nos. 1 to 3 are comparative examples. The sample No. 1 is an optical fiber cable having a structure in which two tensile strength members are embedded in the cable sheath, the samples Nos. 2 and 3 are optical fiber cables having a structure in which four tensile strength members are embedded in the cable sheath. Samples Nos. 4 to 8 and 11 are optical fiber cables having a structure in which eight tensile strength members, two of which are paired with each other, are embedded in the cable sheath, and correspond to the optical fiber cable of the first embodiment. Samples Nos. 9 and 10 are optical fiber cables having a structure in which eight tensile strength members, two of which are paired with each other, are embedded in the cable sheath, and a protrusion is provided on the outer peripheral portion of the cable sheath, and correspond to the optical fiber cable of the second embodiment. A sample No. 9 has a structure in which the protrusion 7 is formed linearly along the longitudinal direction of the optical fiber cable 1B. A sample No. 10 has a structure in which the protrusion 7 is formed spirally along the longitudinal direction of the optical fiber cable 1B as illustrated in FIG. 4.

In addition, the tensile strength members of the samples Nos. 1, 2, and 4 are glass FRPs having an outer diameter of 0.5 mm. The tensile strength members of the samples Nos. 3 and 5 to 10 are aramid FRPs having an outer diameter of 0.5 mm. The tensile strength member of the sample No. 11 is a liquid crystal polymer having an outer diameter of 0.5 mm.

The sample No. 6 is an optical fiber cable in which the silicon-based release agent of 1 wt % is added to the cable sheath, the samples Nos. 7, 9, and 10 are optical fiber cables in which the silicon-based release agent of 1.5 wt % is added thereto, and the samples Nos. 8 and 11 are optical fiber cables in which the silicon-based release agent of 2.5 wt % is added thereto.

The cable outer diameter of each sample is 10 mm.

The maximum and minimum bending rigidity indicates a bending rigidity value in a direction of becoming the maximum bending rigidity and a bending rigidity value in a direction of becoming the minimum bending rigidity when each optical fiber cable is bent in the radial direction. A method for measuring the bending rigidity is in accordance with IEC60794 Stiffness (Method E17A). For example, in the case of the structure illustrated in FIG. 1, the bending rigidity becomes a maximum value when the optical fiber cable is bent in a direction of the tensile strength member 5, and becomes a minimum value when the optical fiber cable is bent in a direction deviating by 45 degrees from the direction of the tensile strength member 5.

The dynamic friction coefficient indicates a friction coefficient between the optical fiber cable that is pneumatically fed into the duct and the inner wall of the duct.

Figure 5:
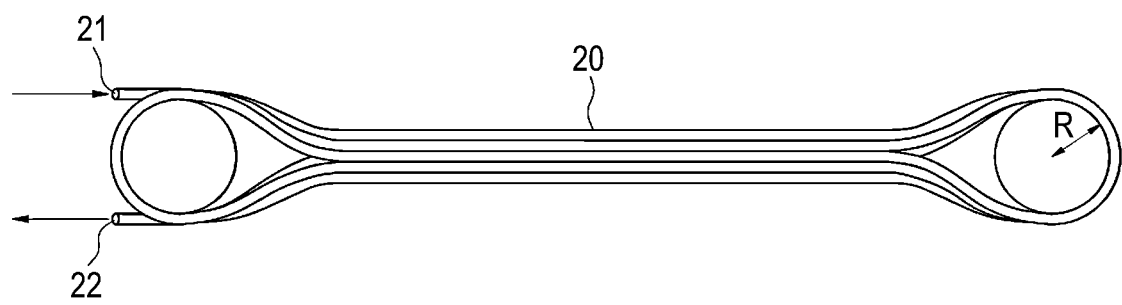
FIG. 5 is a schematic view illustrating a cable pneumatic feeding evaluation device.

In the pneumatic feeding distance, a pneumatic feeding test in accordance with IEC is performed by using a pneumatic feeding device illustrated in FIG. 5. A length of a pipe 20 is 1,000 m, and the pipe 20 is folded back every 100 m. Bending (R) of the pipe 20 is 40 times an outer diameter of the pipe, and an inner diameter of the pipe 20 is 14 mm. An opening 21 is an inlet for air and an optical fiber cable, and an opening 22 is an outlet for the air and the optical fiber cable. An air pressure is set to 1.3 MPa to 1.5 MPa.

In the evaluation of the pneumatic feeding distance, a sample, the pneumatic feeding distance of which is 1,800 m or more, is evaluated as S; a sample, the pneumatic feeding distance of which is 1,300 m or more and less than 1,800 m, is evaluated as A; a sample, the pneumatic feeding distance of which is 800 m or more and less than 1,300 in, is evaluated as B; and a sample, the pneumatic feeding distance of which is less than 800 m, is evaluated as C.

According to the evaluation result in Table 1, the samples (the samples evaluated as S), the pneumatic feeding distance of which is 1,800 m or more, are Nos. 7 to 11; and the samples (the samples evaluated as A), the pneumatic feeding distance of which is 1,300 m or more and less than 1,800 m, are Nos. 4 to 6. On the other hand, the samples (the samples evaluated as B), the pneumatic feeding distance of which is 800 in or more and less than 1,300 m, are Nos. 2 and 3; and the sample (the sample evaluated as C), the pneumatic feeding distance of which is less than 800 m, is No. 1. Accordingly, in the optical fiber cable, it is found out that the pneumatic feeding distance can be increased to 1,300 m or more by allowing a total of eight tensile strength members, two of which are paired with each other, to be embedded in the cable sheath.

Since the samples (the samples evaluated as S), the pneumatic feeding distance of which is 1,800 m or more, are Nos. 7 to 11, it is found out that when the silicone-based release agent of 1.5 wt % or more is added to the cable sheath, the dynamic friction coefficient can be reduced to about one-third as compared with a case in which the silicone-based release agent is not added thereto, such that the pneumatic feeding distance could be significantly extended. However, when the silicone-based release agent of 2.5 wt % is added to the cable sheath, the cable sheath becomes slightly soft, such that it is found out that the bending rigidity becomes smaller and an expansion rate of the pneumatic feeding distance becomes slower than those of the above-described case in which the silicone-based release agent of 1.5 wt % is added thereto. When the silicon-based release agent is added in an amount of more than 2.5 wt %, winding collapse of the optical fiber cable occurs such that handleability thereof deteriorates. From this point, it is found out that an addition ratio of the silicone-based release agent is desirably 1.5 wt % or more and 2.5 wt % or less.

It is found out that the pneumatic feeding distance can be increased to 1,900 m or more by providing the protrusion on the cable sheath as in the samples Nos. 9 and 10. It is found out that the pneumatic feeding distance can be extended up to 2,000 in by providing the protrusion in the spiral shape along the longitudinal direction of the optical fiber cable.

In order to further improve the characteristic of the optical fiber cable, the secondary resin of the optical fibers 11A to 11L is examined. As a result, it is found out that by blending the inorganic oxide particle with the secondary resin, the lateral pressure characteristic of the optical fiber ribbon can be improved, and the core density can be increased by about 1.0 to 1.5 cores/mm$^2$.

Third Embodiment

An optical fiber cable 1C according to a third embodiment will be described with reference to FIG. 6. The same configurations as those of the optical fiber cable 1A according to the first embodiment will be denoted by the same reference signs, and the description thereof will be omitted.

Figure 6:
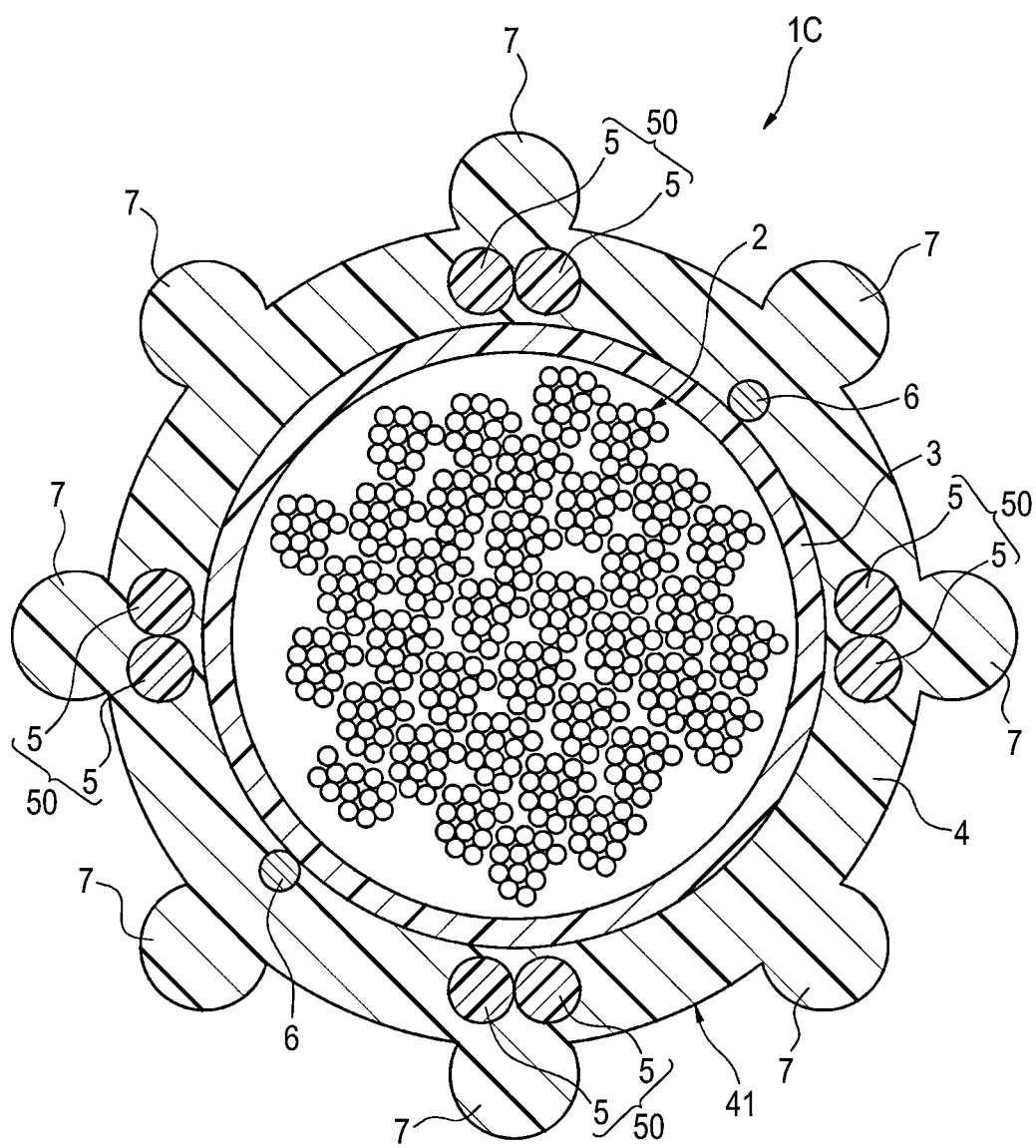
FIG. 6 is a cross-sectional view illustrating a configuration of an optical fiber cable according to a third embodiment.

FIG. 6 is a cross-sectional view perpendicular to a longitudinal direction of the optical fiber cable 1C.

As illustrated in FIG. 6, the optical fiber cable 1C includes a plurality of optical fiber ribbons 2, the water absorbing tape 3 that covers the periphery of the optical fiber ribbon 2, the cable sheath 4 that covers the periphery of the water absorbing tape 3, and the tensile strength member 5 and the tear string 6 that are provided inside the cable sheath 4. The optical fiber cable 1C includes the protrusion 7 on the outer peripheral portion of the cable sheath 4. A diameter of the optical fiber cable 1C is about 6 mm to 16 mm.

Four tensile strength member units 50, in which two tensile strength members 5 are paired with each other, are provided. In the four tensile strength member units 50, two pairs of two paired tensile strength member units 50 are disposed at locations facing each other with a center of the optical fiber cable 1C interposed therebetween in a cross section in a radial direction of the optical fiber cable 1C.

A plurality of protrusions 7 (eight in this example) are provided on a part of an outer peripheral portion 41 of the cable sheath 4. Each protrusion 7 is provided so as to protrude from the cable sheath 4 toward the outside in the radial direction of the optical fiber cable 1C. The protrusion 7 is formed so as to form a part of a circle in the cross section in the radial direction of the optical fiber cable 1C. For example, the protrusion 7 is formed to be a shape having an outer circumference of a semicircle or more of a circle forming the protrusion 7. The eight protrusions 7 are provided on the outer peripheral portion 41 of the cable sheath 4 at an approximately equal space in the cross section in the radial direction of the optical fiber cable 1C.

Eight protrusions 7 are provided, and each of the protrusions 7 is provided along the longitudinal direction of the optical fiber cable 1C. Each protrusion 7 may be continuously provided along the longitudinal direction, or may be intermittently provided therealong. Each protrusion 7 may be provided linearly along the longitudinal direction of the optical fiber cable 1C, or may be provided spirally therealong. The protrusion 7 is formed to be integrated with the cable sheath 4. For example, the protrusion 7 is formed by extrusion molding together with the cable sheath 4.

Figure 7:
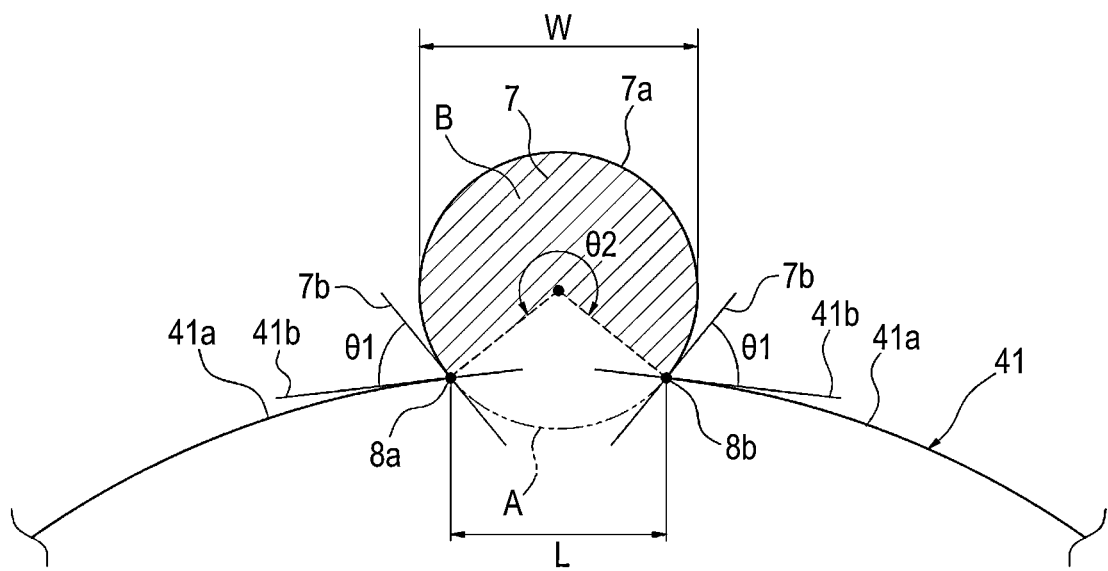
FIG. 7 is an enlarged view schematically illustrating a cross section in a cable radial direction of a protrusion and an outer peripheral portion of the optical fiber cable according to the third embodiment.

FIG. 7 is an enlarged view schematically illustrating a cross section in the cable radial direction of the protrusion 7 and the outer peripheral portion 41.

As illustrated in FIG. 7, the protrusion 7 is formed so that a part of a circle A protrudes from the outer peripheral portion 41 in the cross section in the radial direction of the optical fiber cable 1C. In a portion where the circle A protrudes from the outer peripheral portion 41, a portion indicated by a diagonal line forms a fan shape B, and a central angle $\theta 2$ of the fan shape B is 180 degrees or more.

In the protrusion 7 provided in this manner, intersections 8a and 8b between a surface 7a of the protrusion 7 and a surface 41a of the outer peripheral portion 41 which is not the protrusion 7 are formed on opposite side portions (left and right side portions in FIG. 7) of the protrusion 7, in the cross section in the cable radial direction. An angle $\theta 1$ formed by a tangent line 7b of the surface 7a and a tangent line 41b of the surface 41a at the intersections 8a and 8b is 90 degrees or less.

Since the angle $\theta 1$ is 90 degrees or less, a distance L between the intersections 8a and 8b of the protrusion 7 is smaller than a maximum width W (a diameter of the circle A in the protrusion 7) in the circumferential direction of the optical fiber cable 1C of the protrusion 7. The maximum width W is desirably 5 mm or less.

As described above, in the optical fiber cable 1C according to the third embodiment, since the protrusion 7 is provided on the outer peripheral portion 41 of the cable sheath 4, a contact area between the optical fiber cable 1C and the inner surface of the duct can be reduced when the pneumatic feeding is performed. As a result, friction between the optical fiber cable 1C and the inner surface of the duct is reduced when the pneumatic feeding is performed, such that the pneumatic feeding distance can be extended.

In addition, a shape of the protrusion 7 has a shape in which a part of the circle A protrudes from the outer peripheral portion 41 in the cross section in the radial direction of the optical fiber cable 1C, and the portion where the circle A protrudes from the outer peripheral portion 41 includes a portion of the fan shape B. In the protrusion 7, the central angle $\theta 2$ of the fan shape B is formed to be 180 degrees or more.

Accordingly, in the cross section in the radial direction of the optical fiber cable 1C, the angle $\theta 1$ formed by the tangent lines 7b and 41b between the surfaces at the intersections 8a and 8h between the surface 7a of the protrusion 7 and the surface 41a of the outer peripheral portion 41 which is not the protrusion 7 is formed to be 90 degrees or less.

Therefore, a blade such as a nipper or the like can be easily fixed to portions of the intersections 8a and 8b. Accordingly, when the protrusion 7 is cut, it is possible to prevent a state in which the nipper or the like slip and cutting the protrusion 7 becomes difficult. Therefore, the protrusion 7 can be easily removed, and airtightness can be maintained when the optical fiber cable is housed in a closure.

As long as there is a gap between the surface 7a of the protrusion 7 and the surface 41a of the outer peripheral portion 41, the blade such as the nipper or the like can be inserted into the gap therebetween, such that the angle $\theta 1$ formed by the tangent lines 7b and 41b may be larger than 0 degrees so that the gap can be formed.

Meanwhile, when the optical fiber cable 1C is mounted on the closure, for example, the optical fiber cable 1C may be caused to pass from an inlet of the closure to an outlet thereof and mounted thereon. In this case, it is required to remove the protrusion 7 in the middle of passing through the inlet of the closure and the outlet thereof among the protrusions 7 of the optical fiber cable 1C. In order to remove the protrusion 7, first, the blade such as the nipper or the like is caused to be closer to the protrusion 7 from the radial direction of the optical fiber cable 1C, and the blade is opened to the maximum width W or more of the protrusion 7 to go over the protrusion 7. Next, it is conceivable to insert the blade such as the nipper or the like that goes over the protrusion 7 into the portions of the intersections 8a and 8b to cut the protrusion 7. On the other hand, according to the optical fiber cable 1C, the maximum width W of the protrusion 7 in the cable circumferential direction is set to 5 mm or less, such that the protrusion 7 can be cut by going over the protrusion 7 from the radial direction of the optical fiber cable 1C. On the other hand, for example, an end portion of the optical fiber cable 1C may be inserted only into the inlet of the closure and mounted thereon. In this case, only the protrusion 7 at the end portion among the protrusions 7 of the optical fiber cable 1C may be cut, and the blade such as the nipper or the like can be inserted into the portions of the intersections 8a and 8b from an end portion side in the longitudinal direction of the optical fiber cable 1C. Therefore, the embodiment is satisfied as long as the blade such as the nipper or the like can be opened at the distance L or more between the intersections 8a and 8b, such that for example, even when the maximum width W of the protrusion 7 is larger than 5 mm, the protrusion 7 can be easily cut off when a width of a base of the protrusion 7 is set to 5 mm or less.

Figure 8:
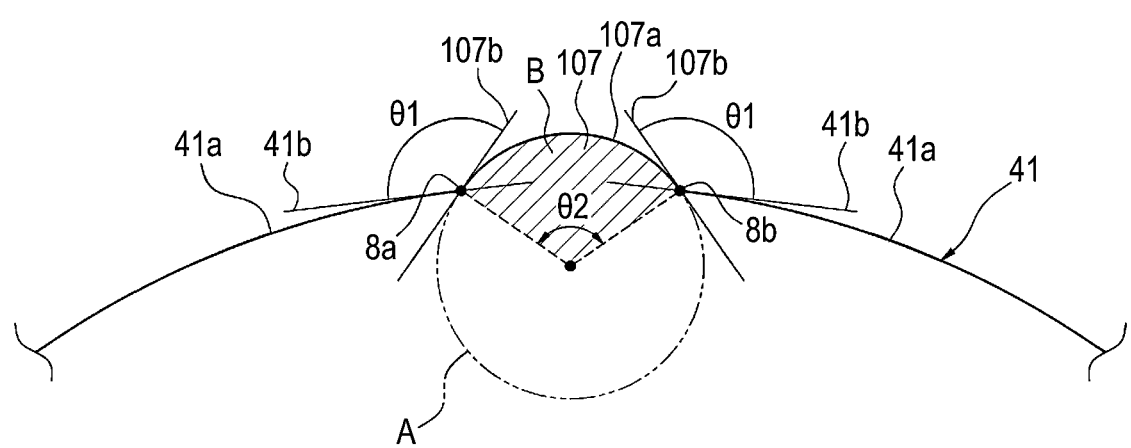
FIG. 8 is an enlarged view schematically illustrating a cross section in a cable radial direction of a protrusion and an outer peripheral portion of a comparative example of the optical fiber cable according to the third embodiment.

Next, with reference to FIG. 8, a difference between a comparative example of the protrusion and the protrusion 7 of the third embodiment will be described. FIG. 8 is an enlarged view schematically illustrating a cross section in a cable radial direction of a protrusion 107 and the outer peripheral portion 41 of the comparative example.

As illustrated in FIG. 8, the protrusion 107 of the comparative example has a shape in which a part of the circle A protrudes from the outer peripheral portion 41 in the cross section in the radial direction of the optical fiber cable. The protrusion 107 of the comparative example is different from the protrusion 7 of the third embodiment in that the central angle θ2 of the fan shape B forming an arc of a surface 107a is formed to be less than 180 degrees (about 100 degrees in the example of FIG. 8).

In the comparative example, the angle θ1 formed by the tangent lines 107b and 41b between the surfaces at the intersections 8a and 8b between the surface 107a of the protrusion 107 and the surface 41a of the outer peripheral portion 41, which is not the protrusion 107, is formed to be larger than 90 degrees (in the example of FIG. 8, about 135 degrees). In the above-described protrusion 107, it is difficult to fix the blade such as the nipper or the like to the portions of the intersections 8a and 8b on the opposite sides of the protrusion 107, such that when the protrusion 107 is cut off, the blade such as the nipper or the like slips and cutting off the protrusion 107 becomes difficult.

Example 2

Samples Nos. 1 to 6 of optical fiber cables, in which the maximum width W of the protrusion and the angle θ1 are different in the protrusion 7 of the optical fiber cable 1A according to the third embodiment or the protrusion 107 of the comparative example, are prepared. The diameter of the optical fiber cables of the samples Nos. 1 to 6 is set to 12 mm. The pneumatic feeding distance, ease of protrusion removal, and airtightness are evaluated for the samples Nos. 1 to 6. An evaluation result thereof is shown in Table 2 below

TABLE 2

| Sample No. | Maximum width W of protrusion | Angle θ1 | Pneumatic feeding distance | Ease of protrusion removal | Airtightness |
| --- | --- | --- | --- | --- | --- |
| 1 | 6 mm | 90 degrees or less | B | B | A (after protrusion removal) |
| 2 | 6 mm | 90 degrees or more | B | C | B (without protrusion removal) |
| 3 | 5 mm | 90 degrees or less | A | A | A (after protrusion removal) |
| 4 | 5 mm | 90 degrees or more | A | C | C (without protrusion removal) |
| 5 | 4 mm | 90 degrees or less | A | A | A (after protrusion removal) |
| 6 | 4 mm | 90 degrees or more | A | C | C (without protrusion removal) |

The maximum width W of the protrusion is 6 mm with respect to the samples Nos. 1 and 2, 5 mm with respect to the samples Nos. 3 and 4, and 4 mm with respect to the samples Nos. 5 and 6. The samples Nos. 1, 3, and 5 are optical fiber cables 1C of the example 2 in which the angle θ1 is 90 degrees or less. The samples Nos. 2, 4, and 6 are optical fiber cables of the comparative example in which the angle θ1 is larger than 90 degrees.

With respect to the pneumatic feeding distance, a microduct pneumatic feeding test in accordance with IEC is performed by using the pneumatic feeding device illustrated in FIG. 5. A length of the pipe 20 is 1,000 in, and the pipe 20 is folded back every 100 m. The bending (R) of the pipe 20 is 40 times the outer diameter of the pipe, and the inner diameter of the pipe 20 is 14 mm. The opening 21 is the inlet for the air and the optical fiber cable, and the opening 22 is the outlet for the air and the optical fiber cable. The air pressure is set to 1.3 MPa to 1.5 MPa.

The ease of the protrusion removal is evaluated by cutting the protrusion using a cutting tool such as a nipper or the like.

In the evaluation of the airtightness, the airtightness of the closure when the optical fiber cable is housed in the closure is evaluated.

In the evaluation of the pneumatic feeding distance, a sample, the pneumatic feeding distance of which exceeds 1,000 m, is evaluated as A: a sample, the pneumatic feeding distance of which is 1,000 m, is evaluated as B; and a sample, the pneumatic feeding distance of which is less than 1,000 m, is evaluated as C.

In the evaluation of the ease of the protrusion removal, a sample, the protrusion removal of which is easily performed, is evaluated as A; a sample, in which the protrusion removal can be performed but the blade such the nipper or the like is difficult to be inserted, is evaluated as B; and a sample, the protrusion removal of which is difficult, is evaluated as C.

In the evaluation of the airtightness, the sample, the ease of the protrusion removal of which is evaluated as A or B, is housed in the closure with the protrusion removed, and the airtightness of the closure is evaluated. The sample, the ease of the protrusion removal of which is evaluated as C, is housed in the closure without removing the protrusion and the airtightness of the closure is evaluated, in the evaluation of the airtightness, a sample, the airtightness of which is good, is evaluated as A; a sample, the airtightness of which is maintained by deformation of a grommet, is evaluated as B; and a sample, the airtightness of which is poor, is evaluated as C.

According to the evaluation result in Table 2, the samples (the samples evaluated as A), the pneumatic feeding distance of which exceeds 1,000 m, are Nos. 3, 4, 5, and 6. On the other hand; the samples (the samples evaluated as B), the pneumatic feeding distance of which is 1,000 m, are Nos. 1 and 2. Accordingly, in the optical fiber cable having a diameter of 12 mm, it is found out that when the maximum width W of the protrusion is 5 mm or less, the pneumatic feeding exceeding 1,000 in can be performed.

In addition, in the ease of the protrusion removal, the samples (the samples evaluated as A), the protrusion removal of which is easily performed, are Nos. 3 and 5. The sample (the sample evaluated as B), in which the protrusion removal can be performed but the blade such the nipper or the like is difficult to be inserted into the protrusion, is No. 1. On the other hand, the samples (the sample evaluated as C), the protrusion removal of which is difficult, are Nos. 2, 4, and 6. Accordingly, when the angle $\theta 1$ is 90 degrees or less and the maximum width W of the protrusion is 5 mm or less in the protrusion of the optical fiber cable, it is found out that the protrusion removal can be easily performed. When the angle $\theta 1$ is 90 degrees or less and the maximum width W of the protrusion is larger than 5 mm, it is found out that it is difficult to insert the blade such as the nipper or the like toward the protrusion, but the protrusion can be removed. On the other hand, when the angle $\theta 1$ is larger than 90 degrees, it is found out that the protrusion removal is difficult to be performed regardless of the size of the maximum width W of the protrusion.

The samples (the samples evaluated as A), the airtightness of which is good are. Nos. 1, 3, and 5. The sample (the sample evaluated as B), the airtightness of which is maintained by the deformation of the grommet, is No. 2. On the other hand, the samples (evaluated as C), the airtightness of which is poor, are Nos. 4 and 6. Accordingly, it is found out that in the optical fiber cable, when the angle $\theta 1$ is 90 degrees or less, the protrusion can be removed even though the maximum width W of the protrusion is 5 mm or less or larger than 5 mm, and the airtightness can be improved by removing the protrusion. However, when the maximum width W becomes too large, for example, larger than 5 mm, it is difficult to remove the protrusion with the nipper or the like, such that it is required to limit the maximum width W up to about several tens of mm at the maximum.

On the other hand, when the angle $\theta 1$ is larger than 90 degrees and it is difficult to remove the protrusion, it is found out that when the maximum width W of the protrusion is 5 mm or less, it is difficult to close the gap caused by unevenness of the protrusion by the deformation of the grommet, such that the airtightness is not maintained. However, even when the angle $\theta 1$ is larger than 90 degrees and it is difficult to remove the protrusion, it is found out that when the maximum width W of the protrusion is larger than 5 mm, the airtightness is maintained by the deformation of the grommet even in a state where the protrusion is not removed.

Even when the maximum width W of the protrusion is larger than 5 mm, and when the angle $\theta 1$ is 90 degrees or less, it is found out that it is difficult to close the gap by the deformation of the grommet in the state where the protrusion is not removed, such that the airtightness is maintained.

Fourth Embodiment

An optical fiber cable 1D according to a fourth embodiment will be described with reference to FIG. 9. The same configurations as those of the optical fiber cable 1A according to the first embodiment will be denoted by the same reference signs, and the description thereof will be omitted.

Figure 9:
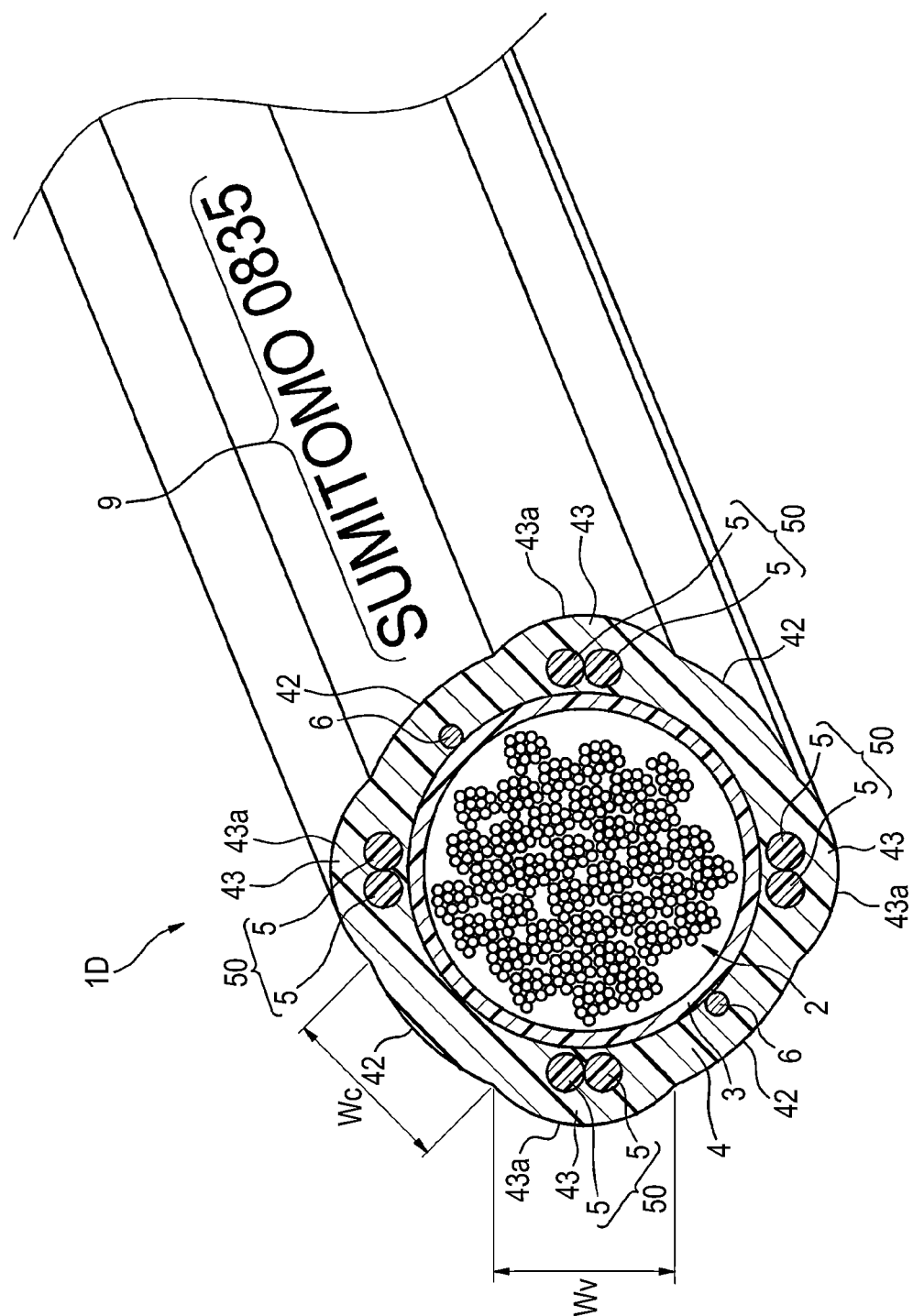
FIG. 9 is a cross-sectional view illustrating a configuration of an optical fiber cable according to a fourth embodiment.

FIG. 9 is a perspective view illustrating a configuration of the optical fiber cable 1D according to the fourth embodiment. As illustrated in FIG. 9, the optical fiber cable 1D includes a plurality of optical fiber ribbons 2, the water absorbing tape 3 that covers the periphery of the optical fiber ribbon 2, the cable sheath 4 that covers the periphery of the water absorbing tape 3, and the tensile strength member unit 50, in which two tensile strength members 5 are configured to be paired with each other, and the tear string 6 that are provided inside the cable sheath 4.

The cable sheath 4 includes a concave portion 42 on a surface thereof. A convex portion 43 is provided on the surface of the cable sheath 4 other than the concave portion 42. The concave portion 42 and the convex portion 43 are alternately provided on the surface of the cable sheath 4 so as to be adjacent to each other in a cross section in a radial direction of the optical fiber cable 1D. In this example, four concave portions 42 and four convex portions 43 are provided in the cross section in the radial direction of the optical fiber cable 1D. The four concave portions 42 and the four convex portions 43 are provided on the surface of the cable sheath 4 at an approximately equal space in the cross section in the radial direction of the optical fiber cable 1D. The number of concave portions 42 and convex portions 43 is not limited to four.

The concave portion 42 is a portion in which a diameter of the optical fiber cable 1D is smaller than a portion of the convex portion 43 in the cross section in the radial direction of the cable sheath 4. The concave portion 42 is continuously provided linearly along a longitudinal direction of the optical fiber cable 1D. The convex portion 43 is also provided along the longitudinal direction of the optical fiber cable 1D, and the convex portion 43 may be continuously provided along the longitudinal direction thereof, or may be intermittently provided therealong.

The concave portion 42 and the convex portion 43 may be provided linearly along the longitudinal direction of the optical fiber cable 1D, or may be provided spirally therealong. The concave portion 42 and the convex portion 43 of this example are continuously provided linearly along the longitudinal direction of the optical fiber cable 1D. The concave portion 42 and the convex portion 43 are formed to be integrated with each other by, for example, extrusion molding. In the example of FIG. 9, in the convex portion 43, an end surface 43a in a direction in which the convex portion 43 protrudes is formed in a curved surface having a constant curvature, and is not limited thereto. For example, the end surface 43a may be formed in a combination of a curved surface having a different curvature and a flat surface. The surface of the concave portion 42 may also not be formed in an arc-shaped curved surface, or may be formed in, for example, a combination of a curved surface having a different curvature and a flat surface.

A ratio of a width We of the concave portion 42 in a circumferential direction of the cable sheath 4 to a width Wv of the convex portion 43 in the circumferential direction of the cable sheath 4 is formed to be smaller than 2:1. That is, the width Wc of the concave portion 42 and the width Wv of the convex portion 43 are formed so as to satisfy a relationship of Wc<2Wv.

The width Wc of the concave portion 42 is formed to be 3 mm or more. The width Wc can vary depending on, for example, the outer diameter of the optical fiber cable 1D.

An identification display (a marking) 9 for identifying the optical fiber cable 1D is provided on the surface of the cable sheath 4. The identification display 9 is provided only on the concave portion 42 of the cable sheath 4. The identification display 9 includes information such as, for example, a product name, a company name, the number of optical fiber cores housed in the optical fiber cable 1D, a length (a location) of the cable, the year of manufacture, or the like. A size of a character, a number, or the like provided in the identification display 9 is, for example, 2 mm or more in the longitudinal direction. A size of the identification display 9 can be changed depending on a size of the width Wc of the concave portion 42. For example, the identification display 9 is printed by spraying ink onto the concave portion 42 by using an inkjet printer. Alternatively, the identification display 9 is printed by transferring toner to the concave portion 42 by using a laser printer.

The identification display 9 may be formed by, for example, a hot stamping method in which a stamp is pressed against the concave portion 42 to engrave a character, a number, or the like.

The identification display 9 may be, for example, a color band colored in a band shape extending along the longitudinal direction of the cable on the surface of the concave portion 42. The color band may be provided together with the character, the number, or the like. For example, the color band is formed by simultaneously extruding a material, the color of which is different from that of a sheath main body portion from a die during the extrusion molding of the cable sheath 4.

In the above-described optical fiber cable 1D, the outer diameter of the optical fiber cable 1D is, for example, 16 mm or less when an inner diameter of the micro-duct, into which the optical fiber cable 1D is pneumatically fed, is 20 mm or less. For example, when the inner diameter of the micro-duct, into which the optical fiber cable 1D is pneumatically fed, is 14 mm or less, the outer diameter of the optical fiber cable 1D is 11 mm or less.

The core density obtained by dividing the number of cores of all the optical fibers forming the plurality of optical fiber ribbons 2 by a cable cross-sectional area of the optical fiber cable 1D is desirably 5.0 cores/mm$^2$ or more. For example, when the outer diameter of the optical fiber cable 1D is 10 mm, the thickness of the cable sheath 4 is 1.0 mm, and the outer diameter of the optical fiber is 200 μm, and when the number of optical fiber ribbons 2 including 12 cores housed in the cable sheath 4 of the optical fiber cable 1D is 36, at that time, the number of cores of all the optical fibers is 432 cores, and the core density is 5.5 cores/mm$^2$. The bending rigidity of the optical fiber cable 1D in the radial direction is desirably 0.35 N·m$^2$ or more and 1.3 N·m$^2$ or less in the whole circumferential direction. When the tensile strength member 5 is formed of the aramid FRP, and, for example, when the outer diameter of the optical fiber cable 1D is 10 mm and the thickness of the cable sheath 4 is 1.0 mm, the outer diameter of the aramid FRP is desirably 0.5 mm or more.

As described above, the optical fiber cable 1D according to the fourth embodiment includes the plurality of optical fiber ribbons 2 and the cable sheath 4 inside which the optical fiber ribbons 2 are housed and including the concave portion 42 on the surface thereof. The identification display 9 is provided only on the concave portion 42. According to this configuration, when the optical fiber cable 11) is pneumatically fed, the concave portion 42 is difficult to contact the inner surface of the duct, such that there is little risk that the identification display 9 provided on the concave portion 42 is scraped off by rubbing against the inner surface of the duct. Therefore, the visibility of the identification display 9 provided on the cable sheath 4 can be maintained high. Since the concave portion 42 is provided on the surface of the cable sheath 4 to form a structure in which the surface thereof becomes uneven, the contact area between the optical fiber cable 1D and the inner surface of the duct is reduced, such that the friction between the surface of the cable sheath 4 and the inner surface of the duct during the pneumatic feeding can be reduced. Accordingly, the pneumatic feeding distance can be extended when the optical fiber cable 1D is pneumatically fed into the duct. Since the identification display 9 is provided only on the concave portion 42 on the surface of the cable sheath 4, the identification display 9 does not overlap at a boundary between the concave portion 42 and the convex portion 43, and the visibility of the number, the character, or the like provided in the identification display 9 can be improved.

The optical fiber cable 1D is printed with the number, the character, or the like of the identification display 9 by the inkjet printer or the laser printer, which are generally considered as printers having a high printing speed. Therefore, since the time required for a step of forming the identification display 9 can be shortened, manufacturing efficiency of the optical fiber cable 1D can be improved.

In addition, the optical fiber cable 1D is formed so that the width Wc of the concave portion 42 on the surface of the cable sheath 4 is formed to be 3 mm or more. Therefore, the concave portion 42 of the cable sheath 4 can be provided with the identification display 9 including the character, the number, or the like of 2 mm or more, which are generally considered to be easily and visually recognized by the naked eye. Therefore, the visibility of the identification display 9 in the optical fiber cable 1D can be improved.

Meanwhile, when the width Wc of the concave portion 42 is formed to be too wide, the concave portion 42 may contact the inner surface of the duct, and the identification display 9 provided on the concave portion 42 may be scraped off. When the concave portion 42 contacts the inner surface of the duct, the friction between the surface of the cable sheath 4 and the inner surface of the duct becomes large. On the other hand, according to the optical fiber cable 1D, the ratio of the width We of the concave portion 42 to the width Wv of the convex portion 43 is formed to be smaller than 2:1. Accordingly, it is possible to prevent the concave portion 42 from contacting the inner surface of the duct, thereby making it possible to prevent the identification display 9 from being scraped off. Since the convex portion 43 can contact the inner surface of the duct, it is possible to prevent the friction between the surface of the cable sheath 4 and the inner surface of the duct from becoming large, such that sufficiently long pneumatic feeding distance can be achieved.

Example 3

In the optical fiber cable according to the fourth embodiment, evaluation of the visibility of the identification display and evaluation of the pneumatic feeding distance are performed for a plurality of samples having different ratios of the width of the concave portion and the width of the convex portion. An evaluation result thereof is shown in Table 3.

TABLE 3

| Sample No. | 1 | 2 | 3 | 4 | 5 | 6 | 7 |
|---|---|---|---|---|---|---|---|
| Concave portion width (Convex portion width) [mm] | 2.5 (5.3) | 3.0 (4.8) | 3.5 (4.3) | 4.0 (3.8) | 4.5 (3.3) | 5.0 (2.8) | 5.5 (2.3) |
| Visibility of identification display | B | A | A | A | A | A | A |
| Pneumatic feeding distance [m] | A | A | A | A | A | A | B |

In Table 3, the outer diameter of the optical fiber cable is 10 mm. The number of concave portions (convex portions) of the cable sheath is four, which is the same as the number of concave portions (convex portions) of the optical fiber cable 1D illustrated in FIG. 9. For the identification display of the cable sheath, a character and a number of 2 mm are printed in the concave portion by using an inkjet printer.

The visibility of the identification display is visually determined based on whether the printed character and number can be visually recognized and distinguished from other characters and numbers (for example, whether the printed number is "8" or "0" can be identified).

In the pneumatic feeding distance, a micro-duct pneumatic feeding test in accordance with IEC is performed by using the pneumatic feeding device illustrated in FIG. 5. The length of the pipe 20 is 1,000 m, and the pipe 20 is folded back every 100 m. The bending (R) of the pipe 20 is 40 times the outer diameter of the pipe, and the inner diameter of the pipe 20 is 14 mm. The opening 21 is the inlet for the air and the optical fiber cable, and the opening 22 is the outlet for the air and the optical fiber cable. The air pressure is set to 1.3 MPa to 1.5 MPa.

In the evaluation of the visibility of the identification display, a sample having a good visibility is evaluated as A; a sample which can be visible is evaluated as B; and a sample which is difficult to be visible is evaluated as C.

In the evaluation of the pneumatic feeding distance, a sample, the pneumatic feeding distance of which is 1,000 m or more, is evaluated as A; a sample, the pneumatic feeding distance of which is 600 m or more and less than 1,000 m, is evaluated as B; and a sample, the pneumatic feeding distance of which is less than 600 m, is evaluated as C.

According to the evaluation result in Table 3, in the visibility of the identification display; the samples (the samples evaluated as A) having a good visibility are Nos. 2 to 7. The sample (the sample evaluated as B) which can be visible is No. 1. Accordingly, it is found out that the visibility of the identification display is good when the width of the concave portion is 3 mm or more. On the other hand, when the width of the concave portion is 2.5 mm, it is possible to print the character or the like of 2 mm in the concave portion, but due to manufacturing variations, the identification display may overlap at the boundary between the concave portion and the convex portion, and in this case, it is found out that the identification display can be visible but the visibility of the identification display is not good.

The samples (the samples evaluated as A), the pneumatic feeding distance of which is 1,000 m or more, are Nos. 1 to 6. The sample (the sample evaluated as B), the pneumatic feeding distance of which is less than 1,000 m, is No. 7. Accordingly, it is found out that the pneumatic feeding distance is good when the ratio of the width of the concave portion to the width of the convex portion is smaller than 2:1 in the optical fiber cable.

Fifth Embodiment

An optical fiber cable 1E according to a fifth embodiment will be described with reference to FIG. 10. The same configurations as those of the optical fiber cable 1A according to the first embodiment will be denoted by the same reference signs, and the description thereof will be omitted.

The optical fiber cable 1E illustrated in 10 is a slotless type. For example, the optical fiber cable 1E includes a round-shaped gathering core 111 and a cable sheath 113 formed around a periphery of the gathering core 111. For example, a plurality of intermittent type optical fiber ribbons 2 including 12 cores are housed in the gathering core 111. In addition to the intermittent type optical fiber ribbon, it is also possible to house a plurality of single core optical fibers in a bundled state.

The gathering core 111 of the optical fiber cable 1E is, for example, longitudinally or spirally wrapped with the water absorbing tape 3 to form a round shape. An outside of the water absorbing tape 3 is covered with the cable sheath 113 formed of two types of polyethylene (PE). In the cable sheath 113 (an inner layer 114 which will be described later), four tensile strength member units 50, in which, for example, two tensile strength members (tension members) 5 for maintaining strength in the longitudinal direction are configured to be paired with each other, and two tear strings 6 for tearing the cable sheath 113 in the longitudinal direction of the cable are longitudinally wrapped therearound and embedded therein during the extrusion molding of the cable sheath 113 (the inner layer 114).

As the tensile strength member 5, wire rods having a proof stress against tension and compression such as, for example, a steel wire. Fiber Reinforced Plastics (FRP), or the like are used. For example, two of the four tensile strength member units 50, which are paired with each other, are provided on opposite sides with the gathering core 111 interposed therebetween. The locations of the respective tensile strength member units 50 are locations where two straight lines respectively connecting the two paired tensile strength member units 50 are orthogonal to each other. The tear strings 6 are respectively provided on opposite sides with the gathering core 111 interposed therebetween. The tear string 6 is, for example, a string-shaped member having a circular cross section using a resin material such as nylon, polyester, or the like, and the tear strings 6 are disposed, for example, on the same straight line along a radial direction of the gathering core 111.

Figure 10:
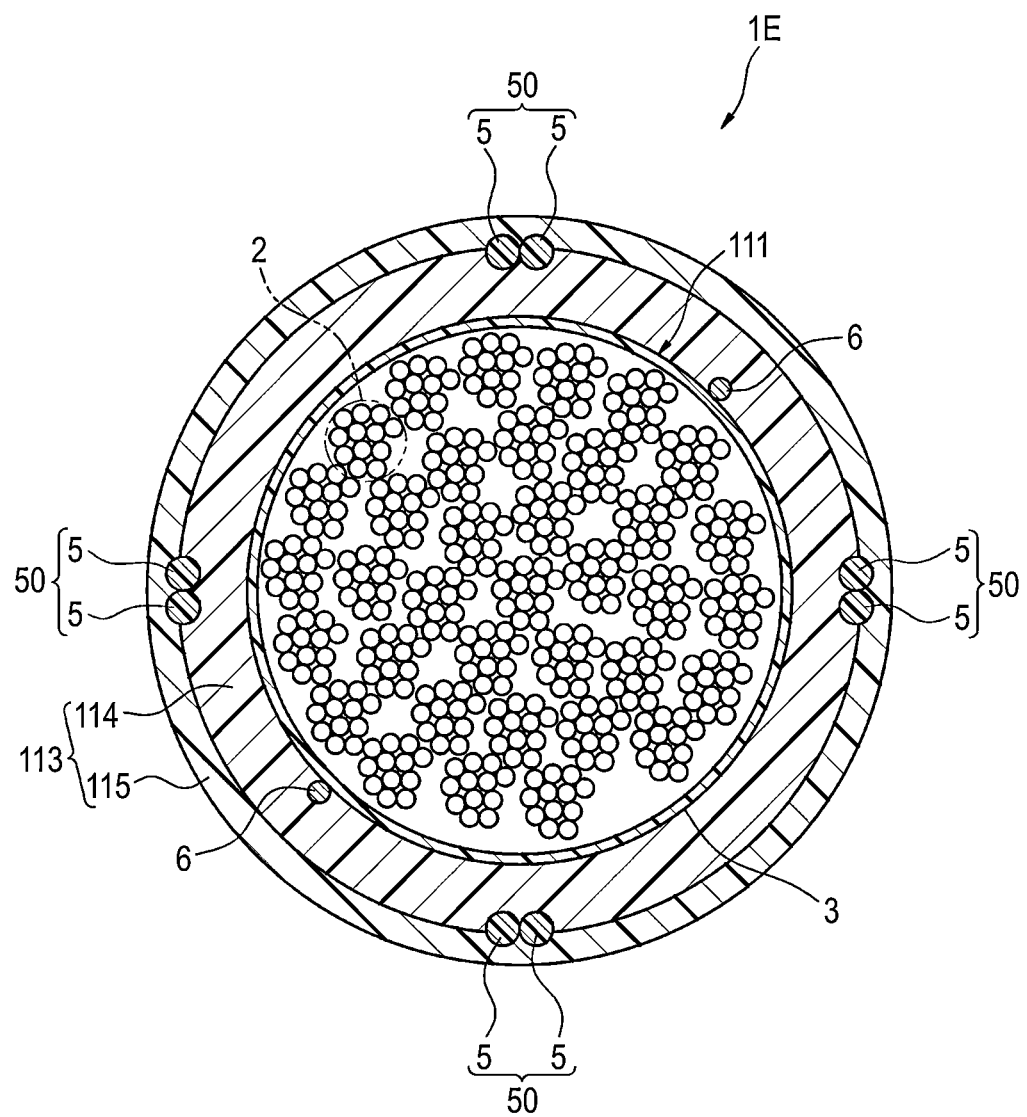
FIG. 10 is a cross-sectional view illustrating a configuration of an optical fiber cable according to a fifth embodiment.

As illustrated in FIG. 10, the cable sheath 113 is formed of two layers including the inner layer 114 and the outer layer 115. The inner layer 114 is in contact with the gathering core 111, and the outer layer 115 is provided on an outside of the inner layer 114 and covers an outside of the tensile strength member 5.

Since the micro-duct cable is pneumatically fed into the duct, it is desirable to lower a friction coefficient on a cable surface in order to extend the pneumatic feeding distance in the duct. Therefore, as a material to be used for the outer layer 115, a density thereof is 0.942 (g/cm$^3$) or more and 0.98 (g/cm$^3$) or less (for example, 0.95 (g/cm$^3$)), and a tensile elastic modulus thereof is 700 to 1,200 (MPa). The material having the density of 0.942 (g/cm$^3$) or more is also referred to as high-density polyethylene (HDPE).

As described above, the outer layer 115 of the cable sheath 113 is formed of HDPE, and the friction coefficient thereof is lowered, such that the micro-duct cable can easily pass through the duct. When the outer layer 115 is formed of HDPE, the outer layer is hard such that the outer layer can sufficiently withstand the pneumatic feeding even though the pneumatic feeding supplied into the duct is increased or the micro-duct cable is pushed into the duct. However, when the cable sheath 113 is formed of HDPE only, the tensile elastic modulus is high, such that the optical fiber ribbon 2 in the gathering core 111 is compressed and bent due to shrinkage of the cable sheath 113 at low temperature, which causes an increase in loss. In this case, as illustrated in FIG. 10, in the case of a type of the tensile strength member 5 embedded in the cable sheath 113, it is difficult to increase a diameter of the tensile strength member, such that it is not possible to cope with the shrinkage of the coating. Therefore, as a material to be used for the inner layer 114, a density thereof is 0.91 (g/cm$^3$) or more and less than 0.942 (g/cm$^3$) (for example, 0.93 (g/cm$^3$)), and a tensile elastic modulus thereof is 100 to 600 (MPa), such that the shrinkage thereof is hard to occur at low temperature and thus the increase in attenuation at low temperature is prevented. The material having the density of less than 0,942 (g/cm$^3$) is referred to as low density polyethylene (LDPE) for convenience in order to distinguish between HDPE and LDPE.

FIG. 11 is a table illustrating a specification and an evaluation result of each sample. With respect to the optical fiber cable 1E having an outer diameter of φ12 (mm) and φ16 (mm), a sheath thickness of LDPE of the inner layer 114 (the tensile elastic modulus is 300 (MPa)) and a sheath thickness of HDPE of the outer layer 115 (the tensile elastic modulus is 1,050 (MPa)) are respectively changed: a surface friction coefficient, an amount of change in attenuation at low temperature, a synthetic tensile elastic modulus, and a synthetic tensile elastic modulus×a sheath total cross-sectional area value (also referred to as ES product) are obtained; and whether or not each condition is suitable for the optical fiber cable for pneumatic feeding (A when suitable, B when not suitable) are evaluated.

The surface friction coefficient is a friction coefficient of the cable surface of the optical fiber cable 1E. The amount of change in attenuation at low temperature (dB/km) is an amount of change in attenuation when the optical fiber cable 1E is left at low temperature (−40° C.). The synthetic tensile elastic modulus (MPa) is a tensile elastic modulus of a material obtained by combining the inner layer 114 and the outer layer 115 and converting the combined inner layer 114 and outer layer 115 into one member, and is obtained by using a cross-sectional area ratio of the inner layer 114 and the outer layer 115. The ES product (N) is the product of the synthetic tensile elastic modulus (MPa) and the sheath total cross-sectional area value (mm$^2$), and is one of the indexes of the strength of the cable sheath 113. The synthetic tensile elastic modulus corresponds to a "synthetic tensile elastic modulus of the cable sheath" according to the present disclosure, and the sheath total cross-sectional area value corresponds to a "total cross-sectional area of the cable sheath" according to the present disclosure.

When the outer diameter of the cable (the outer diameter of the optical fiber cable 1E) is set to φ12 (mm), the inner diameter of the cable (the outer diameter of the gathering core 111) is set to φ8 (mm), the LDPE sheath thickness is set to 2 (mm), and the HDPE sheath thickness is set to 0 (mm) (referred to as a sample 1), the LDPE cross-sectional area is 62.8 (mm$^2$), the HDPE cross-sectional area is 0 (mm$^2$), and the HDPE area ratio is 0(%). The HDPE area ratio corresponds to a "ratio of the cross-sectional area of the outer layer to the total cross-sectional area of the cable sheath" according to the present disclosure. In the case of the sample 1, the ES product is 18,850 (N), and the amount of change in attenuation at low temperature is as low as 0.05 (dB/km), but the surface friction coefficient becomes as large as 0.5, which causes the sample 1 to be difficult to pass through the duct, such that it is determined that the sample 1 is not suitable for the optical fiber cable for pneumatic feeding (evaluation B). In the case of sample 1, the bending rigidity is 0.1 (N·m$^2$), and in consideration of this point as well, the bending rigidity value is not sufficient enough for allowing the sample 1 to pass through the duct.

On the other hand, when the outer diameter of the cable is set to φ12 (mm), the inner diameter of the cable is set to φ8 (mm), the LDPE sheath thickness is set to 1 (mm), and the HDPE sheath thickness is set to 1 (mm) (referred to as a sample 2), the LDPE cross-sectional area is 28.3 (mm$^2$), the HDPE cross-sectional area is 34.6 (mm$^2$), and the HDPE cross-section area ratio is 55(%). In the case of this sample 2, the surface friction coefficient is 0.15, the ES product is 44,768 (N), and the amount of charge in attenuation at low temperature is 0.15 (dB/km). In this case, the surface friction coefficient becomes small, and the amount of change in attenuation at low temperature is equal to or less than 0.2 (dB/km) which is a predetermined reference value, such that it is determined that the sample 2 is suitable for the optical fiber cable for pneumatic feeding (evaluation A). In the case of the sample 2, the bending rigidity is 0.85 (N·m$^2$), which is a value sufficient enough for allowing the sample 2 to pass through the duct.

Next, when the outer diameter of the cable is set to φ12 (mm), the inner diameter of the cable is set to φ8 (mm), the LDPE sheath thickness is set to 0 (mm), and the HDPE sheath thickness is set to 2 (mm) (referred to as a sample 3), the LDPE cross-sectional area is 0.0 (mm$^2$), the HDPE cross-sectional area is 62.8 (mm$^2$), and the HDPE area ratio is 100(%). In the case of the sample 3, the surface friction coefficient is 0.15, and the ES product is 65,973 (N), which is greater than 60,000 (N). Therefore, the amount of change in attenuation at low temperature is 0.22 (dB/km), which does not satisfy the predetermined reference value of 0.2 (dB/km) or less, and the increase in attenuation at low temperature cannot be avoided, such that it is determined that the sample 3 is not suitable for the optical fiber cable for pneumatic feeding (evaluation B). In the case of sample 3, the bending rigidity is 1.5 (N·m$^2$).

When the outer diameter of the cable is set to φ16 (mm), the inner diameter of the cable is set to φ12 (mm), the LDPE sheath thickness is set to 2 (mm), and the HDPE sheath thickness is set to 0 (mm) (referred to as a sample 4), the LDPE cross-sectional area is 88.0 (mm$^2$), the HDPE cross-sectional area is 0 (mm$^2$), and the HDPE area ratio is 0(%). In the case of the sample 4, the ES product is 26,389 (N), and the amount of change in attenuation at low temperature is 0.05 (dB/km), but the surface friction coefficient becomes as large as 0.5, which causes the sample 4 to be difficult to pass through the duct, such that it is determined that the sample 4 is not suitable for the optical fiber cable for pneumatic feeding (evaluation B). In the case of the sample 4, the bending rigidity is 0.1 (N·m$^2$), and in consideration of this point as well, the bending rigidity value is not sufficient enough for allowing the sample 4 to pass through the duct.

On the other hand, when the outer diameter of the cable is set to φ16 (mm), the inner diameter of the cable is set to φ12 (mm), the LDPE sheath thickness is set to 1.1 (mm), and the HDPE sheath thickness is set to 0.9 (mm) (referred to as a sample 5), the LDPE cross-sectional area is 45.3 (mm²), the HDPE cross-sectional area is 42.7 (mm²), and the HDPE area ratio is 49(%). In the case of the sample 5, the surface friction coefficient is 0.15, the ES product is 58,410 (N), and the amount of change in attenuation at low temperature is 0.18 (dB/kin). In this case, the surface friction coefficient becomes small, and the amount of change in attenuation at low temperature is equal to or less than 0.2 (dB/km) which is the predetermined reference value, such that it is determined that the sample 5 is suitable for the optical fiber cable for pneumatic feeding (evaluation A). In the case of the sample 5, the bending rigidity is 0.7 (N·m²).

Next, when the outer diameter of the cable is set to φ16 (mm), the inner diameter of the cable is set to φ12 (mm), the LDPE sheath thickness is set to 0 (mm), and the HDPE, sheath thickness is set to 2 (mm) (referred to as a sample 6), the LDPE cross-sectional area is 0 (mm²), the HDPE cross-sectional area is 88.0 (mm²), and the HDPE area ratio is 100(%). In the case of the sample 6, the surface friction coefficient is 0.15, and the ES product is 92,363 (N), which is greater than 60,000 (N). Therefore, the amount of change in attenuation at low temperature is 0.25 (dB/km), which does not satisfy the predetermined reference value of 0.2 (dB/knit or less, and the increase in attenuation at low temperature cannot be avoided, such that it is determined that the sample 6 is not suitable for the optical fiber cable for pneumatic feeding (evaluation B). In the case of sample 6, the bending rigidity is 1.5 (N·m²).

Figure 12:
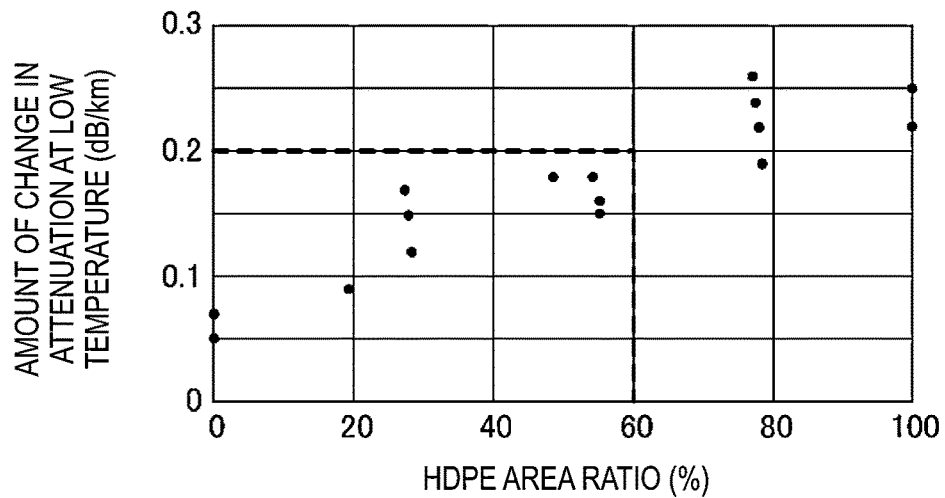
FIG. 12 is a diagram illustrating a relationship between an amount of change in attenuation at low temperature and an HDPE area ratio in the evaluation result of FIG. 11.

FIG. 12 is a diagram illustrating a relationship between the amount of change in attenuation at low temperature and the HDPE area ratio. As the HDPE area ratio decreases, the amount of change in attenuation at low temperature also gradually decreases. It is found out that when the HDPE area ratio is 60(%) or less, the amount of change in attenuation at low temperature can be reduced to the predetermined reference value (0.2 (dB/km)) or less. As described above, when the HDPE area ratio is set to 60(%) or less, it is possible to prevent the increase in attenuation at low temperatures even though the outer layer 115 is formed of HDPE.

Figure 13:
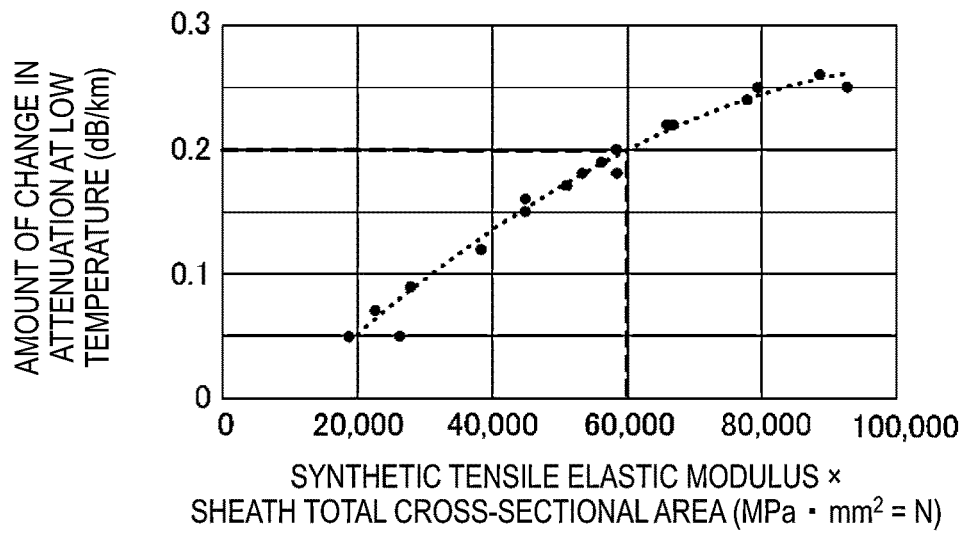
FIG. 13 is a diagram illustrating a relationship between the amount of change in attenuation at low temperature and ES product in the evaluation result of FIG. 11.
Figure 14:
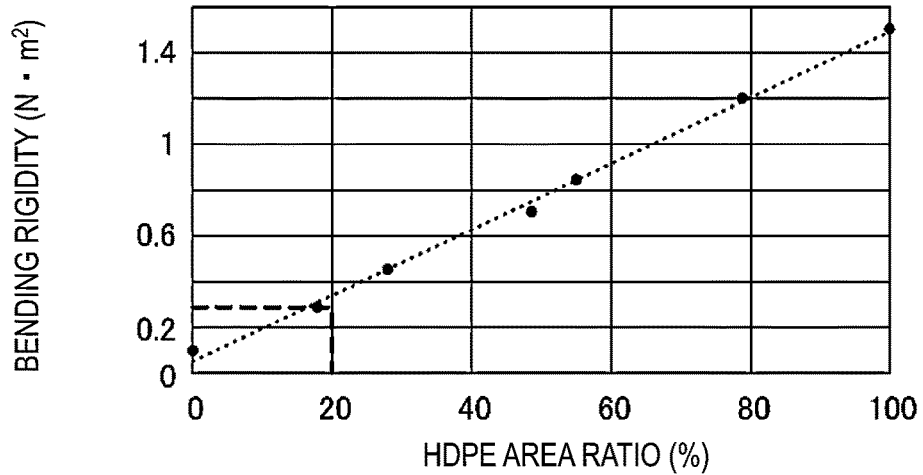
FIG. 14 is a diagram illustrating a relationship between bending rigidity and the HDPE area ratio in the evaluation result of FIG. 11.

FIG. 13 is a diagram illustrating a relationship between the amount of change in attenuation at low temperature and the ES product. As the ES product decreases, the amount of change in attenuation at low temperature also gradually decreases. It is found out that when the ES product is 60,000 (N) or less, the amount of change in attenuation at low temperature can be reduced to the predetermined reference value (0.2 (dB/km)) or less. As described above, when the ES product is set to 60,000 (N) or less, it is possible to prevent the increase in attenuation at low temperatures even though the outer layer 115 is formed of HDPE, FIG. 14 is a diagram illustrating a relationship between the bending rigidity and the HDPE area ratio. As the HDPE area ratio increases, the bending rigidity also increases. It is found out that when the HDPE area ratio is 20(%) or more, the bending rigidity becomes the predetermined reference value of 0.3 (N·m²) or more. Therefore, when the HDPE area ratio is set to 20(%) or more, the optical fiber cable easily passes through the duct and can sufficiently withstand the pneumatic feeding.

Sixth Embodiment

An optical fiber cable 1F according to a sixth embodiment will be described with reference to FIG. 15. The same configurations as those of the optical fiber cable 1B according to the second embodiment will be denoted by the same reference signs, and the description thereof will be omitted.

Figure 15:
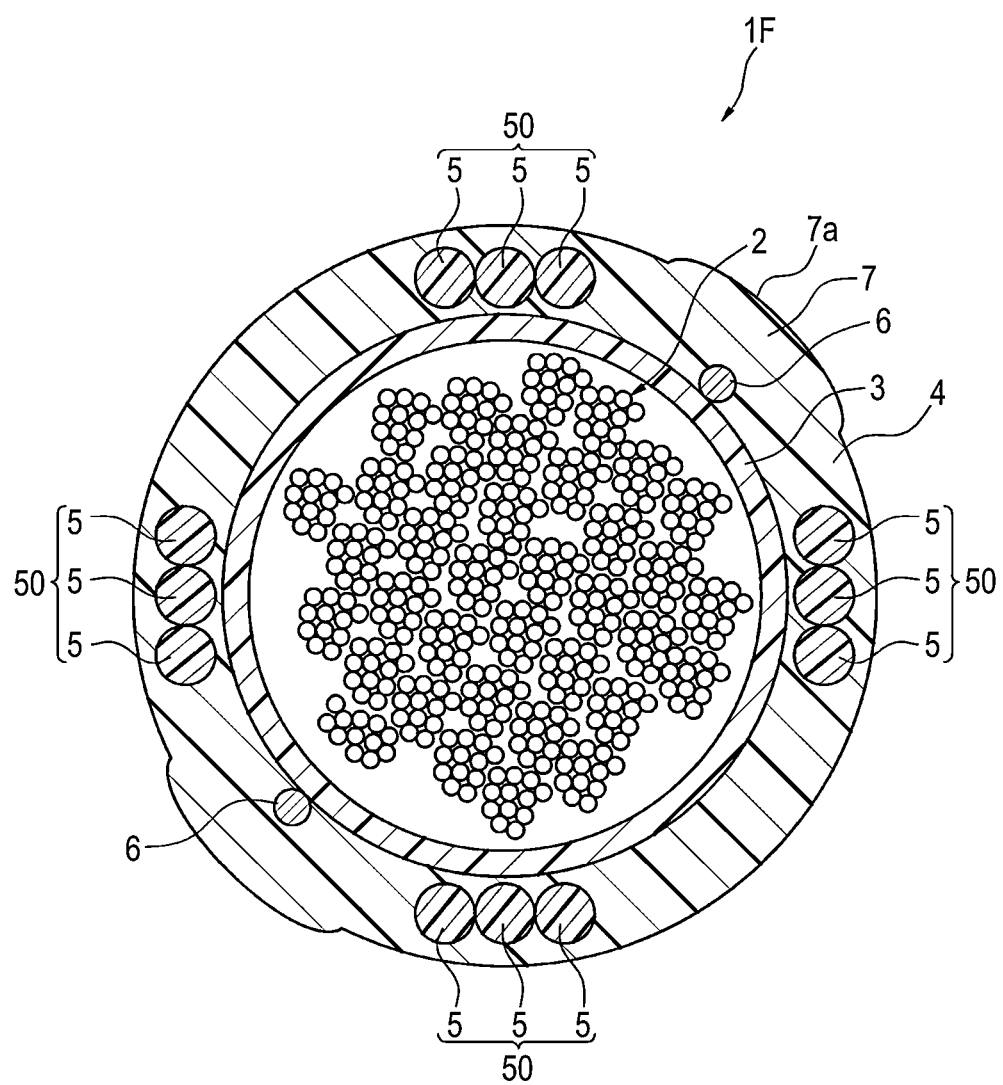
FIG. 15 is a cross-sectional view illustrating a configuration of an optical fiber cable according to a sixth embodiment.

FIG. 15 is a cross-sectional view illustrating a configuration of the optical fiber cable 1F according to the sixth embodiment. As illustrated in FIG. 15, the optical fiber cable 1F includes a plurality of optical fiber ribbons 2, the water absorbing tape 3 that covers the periphery of the optical fiber ribbon 2, the cable sheath 4 that covers the periphery of the water absorbing tape 3, the tensile strength member 5 and the tear string 6 that are provided inside the cable sheath 4, and the protrusion 7 provided on the outer peripheral portion of the cable sheath 4.

The optical fiber cable 1F is different from the optical fiber cable 1B in that the tensile strength member unit 50 is formed of three tensile strength members 5. The optical fiber cable 1F is different from the optical fiber cable 1B in that only two protrusions 7 are provided at locations facing each other in the circumferential direction of the outer peripheral portion of the cable sheath 4 in a cross section in a radial direction of the optical fiber cable 1F.

Seventh Embodiment

An optical fiber cable 1G according to a seventh embodiment will be described with reference to FIG. 16. The same configurations as those of the optical fiber cable 1B according to the second embodiment will be denoted by the same reference signs, and the description thereof will be omitted.

Figure 16:
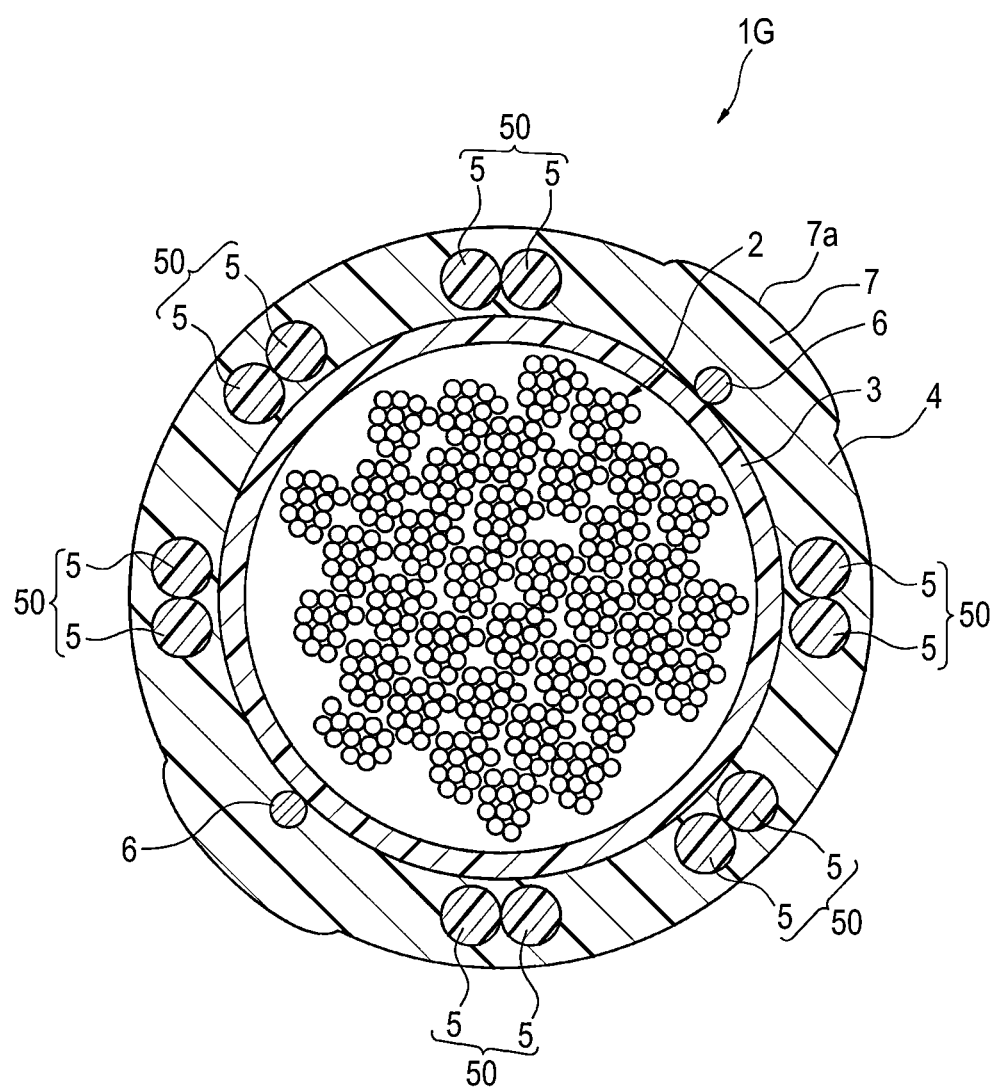
FIG. 16 is a cross-sectional view illustrating a configuration of an optical fiber cable according to a seventh embodiment.

FIG. 16 is a cross-sectional view illustrating a configuration of the optical fiber cable 1G according to the seventh embodiment. As illustrated in FIG. 16, the optical fiber cable 1G includes a plurality of optical fiber ribbons 2, the water absorbing tape 3 that covers the periphery of the optical fiber ribbon 2, the cable sheath 4 that covers the periphery of the water absorbing tape 3, the tensile strength member 5 and the tear string 6 that are provided inside the cable sheath 4, and the protrusion 7 provided on the outer peripheral portion of the cable sheath 4.

The optical fiber cable 1G is different from the optical fiber cable 1B in that a pair of the tensile strength member units 50 is additionally provided as compared with the optical fiber cable 113. The optical fiber cable 1G is different from the optical fiber cable 1B in that only two protrusions 7 are provided at locations facing each other in the circumferential direction of the outer peripheral portion of the cable sheath 4 in a cross section in a radial direction of the optical fiber cable 1G.

Hereinabove, while the present disclosure has been described in detail and with reference to specific embodiments, it is apparent to those skilled in the art that various changes and modifications can be made without departing from the spirit and scope of the present disclosure. Further, the number, location, shape, or the like of the above-described components are not limited to the embodiments, and can be changed to a number, location, shape, or the like suitable for performing the present disclosure.

REFERENCE SIGNS LIST 1A to 1B: optical fiber cable
2: optical fiber ribbon
3: water absorbing tape
4, 113: cable sheath
5: tensile strength member
6: tear string
7, 107: protrusion
7a: surface 8a, 8b: intersection
9: identification display
11A to 11L: optical fiber
12: connecting portion
13: non-connecting portion
14: connecting resin
15: glass fiber
16: inner coating layer
17: outer coating layer
20: pipe
21, 22: opening
41: outer peripheral portion
41a, 107a: surface
41b, 107b: tangent line
42: concave portion
43: convex portion
43a: end surface
50: tensile strength member unit
111: gathering core
114: inner layer
115: outer layer

The invention claimed is:

1. An optical fiber cable, comprising:
a plurality of optical fibers or a plurality of optical fiber ribbons;
a cable sheath inside which a plurality of the optical fibers or a plurality of the optical fiber ribbons are housed; and
four or more tensile strength member units which are provided so as to be embedded inside the cable sheath, and in which two or more tensile strength members are paired with each other,
wherein a circumferential distance between the tensile strength member units adjacent to each other is different than a circumferential distance between the paired tensile strength members,
wherein the four or more tensile strength member units are respectively provided at locations facing each other with a center of the optical fiber cable interposed therebetween in a cross section in a radial direction of the optical fiber cable,
wherein bending rigidity in the radial direction of the optical fiber cable is 0.35 N·m² or more and 1.3 N·m² or less in all directions,
wherein a ratio of a total cross-sectional area of the tensile strength members to a cross-sectional area of the cable sheath is 5.4% or more,
wherein a core density obtained by dividing the number of cores of all the optical fibers forming the plurality of optical fiber ribbons or the plurality of optical fiber cores by a cable cross-sectional area of the optical fiber cable is 5.0 cores/mm² or more, and
wherein a cable outer diameter of the optical fiber cable is 6 mm or more and 16 mm or less.

2. The optical fiber cable according to claim 1,
wherein at least four tensile strength member units of the four or more tensile strength member units of the optical fiber cable are disposed at locations where straight lines respectively connecting a pair of the tensile strength member units are orthogonal to each other in the cross section in the radial direction of the optical fiber cable.

3. The optical fiber cable according to claim 1,
wherein the tensile strength members are aramid FRP.

4. The optical fiber cable according to claim 1,
wherein the tensile strength members are a liquid crystal polymer.

5. The optical fiber cable according to claim 1,
wherein the cable sheath contains a silicone-based release agent.

6. The optical fiber cable according to claim 5,
wherein mass fraction of the silicone-based release agent contained in the cable sheath is 1.5% or more.

7. The optical fiber cable according to claim 1,
wherein the cable sheath includes a protrusion protruding in the radial direction of the optical fiber cable on an outer peripheral portion.

8. The optical fiber cable according to claim 7,
wherein in the protrusion, an angle formed by tangent lines of both surfaces at intersections between a surface of the protrusion and a surface of the outer peripheral portion which is not the protrusion is 90 degrees or less in the cross section in the radial direction of the optical fiber cable.

9. The optical fiber cable according to claim 7,
wherein the protrusion is spirally formed along a longitudinal direction of the optical fiber cable.

10. The optical fiber cable according to claim 1,
wherein the cable sheath includes a concave portion on a surface thereof, and an identification display is applied only to the concave portion.

11. The optical fiber cable according to claim 1,
wherein the cable sheath includes:
an inner layer provided on an outside of a gathering core in which a plurality of the optical fibers or a plurality of the optical fiber ribbons are housed together; and
an outer layer provided on an outside of the inner layer,
wherein a density of a material used for the outer layer thereof is 0.942 (g/cm³) or more, and
wherein a density of a material used for the inner layer thereof is less than 0.942 (g/cm³).

12. The optical fiber cable according to claim 1,
wherein the cable sheath contains flame-retardant PVC or flame-retardant polyethylene having an oxygen index of 50 or more.

13. The optical fiber cable according to claim 1,
wherein the optical fiber or an optical fiber forming the optical fiber ribbon includes:
a glass fiber; and
a coating that covers an outer periphery of the glass fiber,
wherein the coating includes two coating layers,
wherein an outer coating layer of the two coating layers is a cured product of a resin composition containing:
a base resin containing a urethane acrylate oligomer or a urethane methacrylate oligomer, a monomer having a phenoxy group, a photopolymerization initiator, and a silane coupling agent; and
a hydrophobic inorganic oxide particle, and
wherein a content of the inorganic oxide particle in the resin composition is 1% by mass or more and 45% by mass or less based on a total amount of the resin composition.

14. The optical fiber cable according to claim 1,
wherein in the optical fiber or an optical fiber forming the optical fiber ribbon, a bending loss at a wavelength of 1,550 nm is 0.5 dB or less for a bending diameter of φ15 mm×1 turn, and 0.1 dB or less for a bending diameter of φ20 mm×1 turn.

15. The optical fiber cable according to claim 1, wherein the optical fiber or an optical fiber forming the optical fiber ribbon includes a multi-core fiber in which the number of cores per optical fiber is four or more.

* * * * *